US008422359B2

(12) United States Patent
Nakajima

(10) Patent No.: US 8,422,359 B2
(45) Date of Patent: Apr. 16, 2013

(54) COMMUNICATION NETWORK CONTROL SYSTEM AND CONTROL METHOD

(75) Inventor: Akio Nakajima, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 12/738,934

(22) PCT Filed: Mar. 31, 2010

(86) PCT No.: PCT/JP2010/002366
§ 371 (c)(1),
(2), (4) Date: Apr. 20, 2010

(87) PCT Pub. No.: WO2011/121664
PCT Pub. Date: Oct. 6, 2011

(65) Prior Publication Data
US 2012/0039163 A1 Feb. 16, 2012

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......... 370/217; 370/218; 370/225; 370/228; 714/43; 714/48

(58) Field of Classification Search .................. 370/217, 370/218, 225, 227, 228, 351–396; 707/634, 707/792; 714/25, 27, 30, 31, 43, 48, 56, 714/734
See application file for complete search history.

(56) References Cited

U.S. PATENT DOCUMENTS

| 7,512,123 | B1 | 3/2009 | DeSanti et al. | |
|---|---|---|---|---|
| 7,564,869 | B2 | 7/2009 | Cafiero et al. | |
| 2002/0147802 | A1* | 10/2002 | Murotani et al. | 709/223 |
| 2005/0097243 | A1* | 5/2005 | Yamashita et al. | 710/38 |
| 2008/0159277 | A1* | 7/2008 | Vobbilisetty et al. | 370/357 |
| 2009/0245242 | A1 | 10/2009 | Carlson et al. | |
| 2009/0254640 | A1 | 10/2009 | Otani | |
| 2009/0254677 | A1* | 10/2009 | Desanti | 709/242 |
| 2009/0276526 | A1 | 11/2009 | Carlson et al. | |
| 2010/0097941 | A1* | 4/2010 | Carlson et al. | 370/245 |
| 2012/0039163 | A1* | 2/2012 | Nakajima | 370/217 |

FOREIGN PATENT DOCUMENTS

JP 2009-252239 A 10/2009
WO 2010046294 A1 4/2010

OTHER PUBLICATIONS

"Fibre Channel Backbone—5 (FC-BB-5)", Revision 2.0, Jun. 4, 2009, T11/Project 1871-D/Rev 2.00, American National Standard for Information Technology (pp. 81-124), http://www.t11.org/ftp/t11/pub/fc/bb-5/09-056v5.pdf.

(Continued)

*Primary Examiner* — Habte Mered
*Assistant Examiner* — Benjamin H Elliott, IV
(74) *Attorney, Agent, or Firm* — Volpe and Koenig, P.C.

(57) ABSTRACT

In a case where a failure has occurred in one of fabric management mechanisms, nodes resume data I/O communications without degrading performance and without changing the data I/O communication path between the nodes by switching control to the other one of the fabric management mechanisms. The fabric management mechanisms share management information with each other. When a failure occurs in either of the fabric management mechanisms, an E_Node that belongs to the domain, in which a failure has occurred, logs into a normal fabric management mechanism via a newly created management-use communication path. The normal fabric management mechanism allocates an N_Port_ID on the basis of a virtual FC domain number that has been allocated to a switch.

12 Claims, 19 Drawing Sheets

OTHER PUBLICATIONS

John L. Hufferd, Hufferd Enterprises, "Proxy Based Shortcuts" (FCoE Shortcut Proxy—FSP), T11/09-518v0, Oct. 7, 2009, (pp. 1-30), http://www.t11.org/ftp/t11/pub/fc/bb-6/09-518v0.pdf.

John L. Hufferd, Hufferd Enterprises, "Adapter Based Shortcuts" (Direct FCoE Data Transfer End to End), T11/09-516v0, Oct. 7, 2009, (pp. 1-26), http://www.t11.org/ftp/t11/pub/fc/bb-6/09-516v0.pdf.

Silvano Gai, "CISCO End-to-End FCoE Adding details to the idea", T11/09-539v0, Oct. 2009, (pp. 1-17).

* cited by examiner

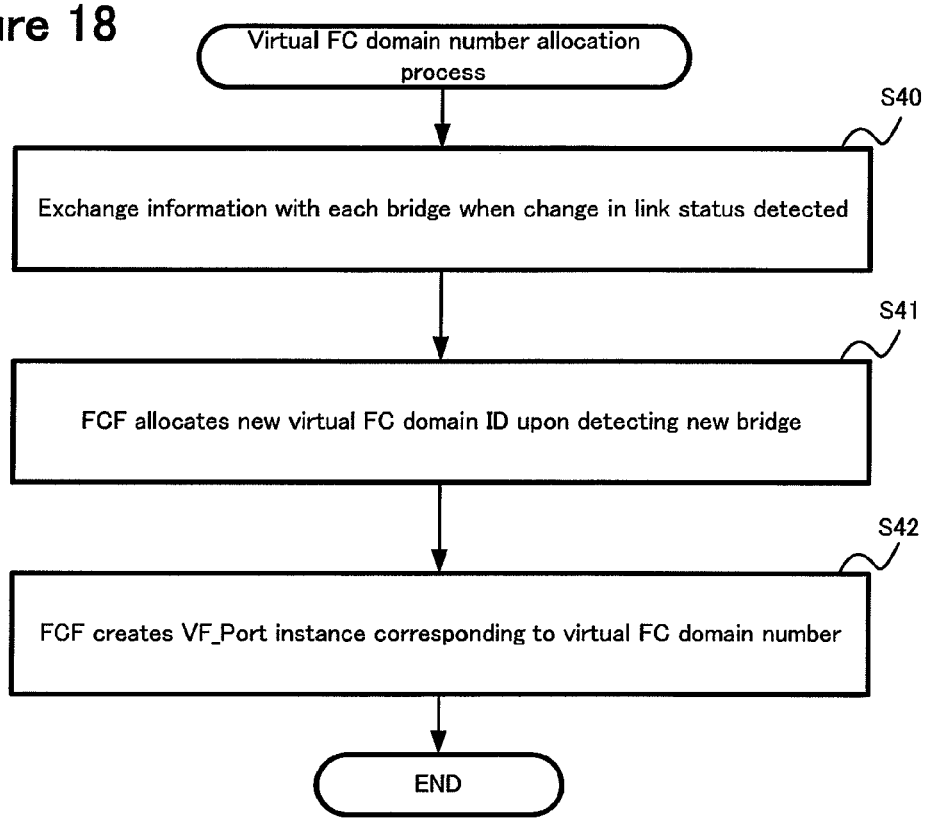

COMMUNICATION NETWORK CONTROL SYSTEM AND CONTROL METHOD

TECHNICAL FIELD

This invention relates to a communication network control system and control method.

BACKGROUND ART

In a large-scale system that comprises large numbers of servers and storage systems, such as at a data center, a plurality of different communication protocols such as those for a LAN (Local Area Network) and a SAN (Storage Area Network) are used. The LAN is used primarily for communications between a server and a client, and between servers. The SAN is utilized for data I/O (Input/Output) communications between the server and the storage systems.

Because the LAN and the SAN use different communication protocols and physical interfaces, a plurality of types of communication interface circuits must be provided, increasing the number of cables for coupling the respective devices as well. In a case where a redundant configuration is created to enhance reliability, the system configuration becomes that much more complex.

Accordingly, a new communication protocol that integrates a fibre channel over Ethernet (Registered Trademark. This description will be omitted hereinbelow) has been proposed. This communication protocol is called the FCoE (Fibre Channel over Ethernet) (Non-Patent Literature 1, Patent Literature 1). The FCoE is a standard designed so that a frame (a fibre channel frame) constructed using a fibre channel is able to be used over the lossless Ethernet.

FCoE is standard of a communication protocol that makes it possible to send and receive a FC (Fibre Channel) frame over the Ethernet by encapsulating the FC frame in an Ethernet frame. In accordance with this, the plurality of types of communication interface circuits that were required in the past can be converged using a CNA (Converged Network Adapter). The CNA makes it possible to converge the multiple physical ports such as LAN ports and SAN ports together into one port, thereby enabling reduction in the number of physical cables, and making it possible to simplify the configuration of a large-scale system.

In the standard of the Non-Patent Literature 1, all of the FCoE frames must be routed one time through an FCoE switch (also called a Fibre Channel Forwarder) to an internal FC switch, which is a component of the FCoE switch.

In contrast to Non-Patent Literature 1, standards for routing via Ethernet bridges that do not have to go through the FCoE switch are in the process of being devised (Non-Patent Literatures 2 and 3). Non-Patent Literatures 2 and 3 are standard proposals related to a function called a shortcut. The shortcut function makes it possible to directly communicate the FCoE frame that encapsulates the FC frame between the server (FCoE initiator) and the storage system (FCoE target) without going through the FCoE switch. Therefore, FCoE frame traffic that had been focused on a single FCoE switch can be distributed via Ethernet bridges. In accordance with this, it becomes unnecessary to prepare a large number of FCoE switches to ensure bandwidth performance. In addition, a network topology having high performance scalability can be constructed by coupling a large number of Ethernet bridges that do not have FCoE functions.

According to Non-Patent Literatures 2 and 3, at least one entity for managing either the FCoE switch or a fabric is required for a single fabric in order to manage the same FC login information as in the past. In a FCoE network, a configuration in which the Ethernet bridges are sandwiched between the FCoE CNA, which is equivalent to a FC HBA, and a mechanism for managing either the FCoE switch or the fabric, which is equivalent to the FC switch, is permitted. For this reason, the FCoE CNA and the FCoE switch are not always directly coupled.

Technology related to switching to a new HBA in a case where an HBA failure occurs in the FCoE has also been disclosed (Patent Literature 2).

CITATION LIST

Non Patent Literature

[NPL 1]
Fibre Channel-Backbone-5-Revision 2.00 (page 81 to 124) http://www.t11.org/ftp/t11/pub/fc/bb-5/09-056v5.pdf
[NPL 2]
T1109-518v0 2009/10/07 Proxy Based Shortcuts http://www.t11.org/ftp/t11/pub/fc/bb-6/09-518v0.pdf
[NPL 3]
T1109-516v0 2009/10/07 Adapter Based Shortcuts http://www.t11.org/ftp/t11/pub/fc/bb-6/09-516v0.pdf

Patent Literature

[PTL 1]
U.S. Pat. No. 7,564,869 B2
[PTL 2]
Japanese Patent Application Laid-Open No. 2009-252239

SUMMARY OF INVENTION

Technical Problem

A conventional fibre channel network implicitly logs out the HBA logged in by the switch when there is a failure in the communication path between the FC port of the fabric coupling (for example, the N_Port) and the FC switch of fabric port (for example, the F_Port). The N_Port is a device port that generates/terminates FC-4 channel traffic.

However, since a configuration in which the FCoE CNA and the FCoE switch are attached indirectly coupled is permitted as a FCoE network topology, the method for realizing a implicit logout process differs for FC and FCoE. In the FCoE network, it is necessary to regularly send and receive a response confirmation message, called a keep alive, back and forth between the server FCoE CNA and the storage system that are logged in to the mechanism that manages either the FCoE switch or the fabric in order to realize a implicit logout the same as the FC. In a case where a response to the sending of a regular keep a live cannot be confirmed, that is, when keep alive response has timed out, either the FCoE switch, the server FCoE port, or the storage system FCoE port implements an implicit logout process. When the logout process is implemented, I/O processing between the server and the storage system is terminated until a fabric login process is performed once again.

The path via which the server FCoE port and the storage system FCoE port login to either the FCoE switch or the fabric management mechanism differs from the path over which data I/O is sent and received between the server FCoE port and the storage system FCoE port. For this reason, the problem arises wherein logout processing is performed in accordance with a single failure of either the FCoE switch or the fabric management mechanism, and all data I/O communications logged into the FCoE switch are terminated despite the fact that communications between the server and the storage apparatus are possible.

In the prior art, insufficient consideration has been given to minimizing the scope of the impact of an FCoE switch failure like this.

Accordingly, an object of the present invention is to provide a communication network control system and control method that make it possible to maintain the redundancy of the communication network and reduce the scope of impact when a failure occurs. Other objects of the present invention should become clear from the description of the embodiment given below.

Solution to Problem

A communication network control system according to a first aspect of the present invention comprises a plurality of fabric management mechanisms that manage a plurality of nodes on the communication network, a plurality of switches, which are provided between the respective fabric management mechanisms and the respective nodes, and which are for communications between the respective fabric management mechanisms and the nodes and for extending communication paths between the nodes, a fabric management information sharing between the respective fabric management mechanisms device for sharing fabric management information managed by each fabric management mechanism, and a switching device, which, in a case where a failure occurs in any of the fabric management mechanisms, couples a plurality of prescribed nodes managed by the fabric management mechanism, in which the failure has occurred, to a normal fabric management mechanism from among the fabric management mechanisms, and which comprises a switch standby port that is able to change states in order to switch the coupling to the normal fabric management mechanism via a failure-use communication path provided between the switches for sending and receiving control information needed to couple each node to each fabric, and each prescribed node communicates with the normal fabric management mechanism via the failure-use communication path, and the normal fabric management mechanism manages the prescribed nodes on the basis of management information acquired from the fabric management mechanism in which a failure has occurred.

In a second aspect according to the first aspect, a communication protocol, which is for transporting a storage area network protocol over a local area network communication medium, and for which a data input/output communication path for each node to send and receive data differs from the fabric control communication path for each node to send and receive the control information needed for coupling to the fabric, is applied to the communication network, a first network domain, which is managed by one of the fabric management mechanisms, and a second network domain which is managed by the other one of the fabric management mechanisms, are set in the communication network, and a redundant configuration is configured in accordance with the first network domain and the second network domain, one half of the respective nodes belongs to the first network domain, the other half of the respective nodes belongs to the second network domain, each of a plurality of computer apparatuses, which are provided on the communication network, have a plurality of first network domain nodes and second network domain nodes, each fabric management mechanism has a mechanism for managing a fibre channel fabric, each fabric management mechanism has a control device that allocates a fibre channel domain number to switches, each switch that is coupled to the first network domain is coupled to each of the nodes that belong to the first network domain, each switch that is coupled to the second network domain is coupled to each of the nodes that belong to the second network domain, the management information sharing device has a memory, which is provided inside the fabric management mechanism and stores management information, and a management information sharing unit that sends and receives the management information from the memory inside the peer fabric management mechanism via an inter-fabric management mechanism communication path that is coupled to the peer fabric management mechanism, the management information includes first access control information for controlling access to the nodes that belong to the first network domain, second access control information for controlling address to the nodes that belong to the second network domain, first login information for managing a coupling configuration of the nodes that are logged into one of the fabric management mechanisms that is in charge of the first network domain, second login information for managing a coupling configuration of the nodes that are logged into the other one of the fabric management mechanisms that is in charge of the second network domain, and switch information for managing the respective switches, and the failure-use communication path is configured using an inter-switch communication circuit for coupling a switch that is coupled to the one of the fabric management mechanisms with another switch that is coupled to the other one of the fabric management mechanisms.

In a third aspect according to the first aspect, the fabric control communication path is a path for communicating with the fabric management mechanism before a failure occurs by way of a switch from a prescribed node that belongs to the same network domain, a data input/output communication path is a path for communicating with the other prescribed node by way of a switch from a certain prescribed node that belongs to the same network domain, and in a case where either a failure of the fabric management mechanism or a failure of the fabric control communication path occurs, the data input/output communication path temporarily ceases to exist, and the data input/output communication path is restored on the same path as that prior to the failure in a case where the nodes have been switched via the fabric control communication path to the normal fabric management mechanism.

In a fourth aspect according to the third aspect, the management information includes access control information for controlling access to the nodes, login information for managing a fabric coupling configuration of the nodes logged into the respective fabric management mechanisms, and switch information related to the switches that are respectively coupled to the fabric management mechanisms.

In a fifth aspect according to the fourth aspect, each fabric management mechanism determines whether or not the prescribed nodes have been switched over normally on the basis of the management information acquired from the fabric management mechanism in which the failure has occurred.

In a sixth aspect according to the first aspect, the failure-use communication path is configured using an inter-switch communication circuit for coupling the switch that is coupled to one of the fabric management mechanisms to the other switch that is coupled to the other one of the fabric management mechanisms, and the inter-switch communication circuit is configured so as to be able to be used in accordance with an instruction from the switching device.

In a seventh aspect according to the first aspect, the failure-use communication path is configured using a redundant communication circuit for coupling the switches to another fabric management mechanism, which differs from the fabric management mechanism that directly manages the respective switches, and with the switching device detecting a failure, the redundant communication circuit creates the fabric control communication path spanning respective network domains having the redundant configuration.

In an eighth aspect according to the first aspect, the failure-use communication path is configured using an inter-switch communication circuit for coupling the switch that is coupled to one of the fabric management mechanisms to the other switch that is coupled to the other one of the fabric management mechanisms, the one of the fabric management mechanisms and the other one of the fabric management mechanisms exchange management information via the inter-switch communication circuit, and in a case where a failure has occurred, the inter-switch communication circuit creates the fabric control communication path spanning respective network domains having the redundant configuration in accordance with the switching device detecting the failure.

In a ninth aspect according to the first aspect, each fabric management mechanism has a control device that allocates a fibre channel domain number to a switch, the control device, which allocates the domain number, allocates a plurality of fibre channel logical fabrics to one network domain, and each fabric management mechanism creates a plurality of logical control ports in one physical port in order to control the fibre channel logical fabrics.

In a tenth aspect according to the first aspect, a Fibre Channel over Ethernet (Ethernet is a registered trademark) protocol, which is a communication protocol for transporting a storage area network protocol over a local area network communication medium, and for which a data input/output communication path for each node to send and receive data I/O differs from a fabric control communication path for each node to send and receive control information needed for coupling to the fabric, is applied to the communication network, and each fabric management mechanism has a name server that manages a fibre channel fabric, and each switch has a switching mechanism for each node to perform a data I/O communication without going through the fabric management mechanism based on either transmission source and destination addresses included in a frame header for the local area network, or the transmission source and destination port addresses included in the fibre channel frame header in the local area network frame.

A method for controlling a communication network in accordance with an eleventh aspect for a plurality of fabric management mechanisms for managing a plurality of nodes on the communication network, and a plurality of switches, which are disposed between the respective fabric management mechanisms and the respective nodes and which manage communications between the respective fabric management mechanism and the respective nodes and communications between the respective nodes, this method comprises the steps of exchanging management information, which is managed by each of the fabric management mechanisms, between the respective fabric management mechanisms, monitoring whether or not a failure has occurred in the fabric management mechanisms, and in a case where a failure has occurred in any of the fabric management mechanisms, coupling a plurality of prescribed nodes, which are being managed by the fabric management mechanism in which the failure occurred, to the normal fabric management mechanism of the fabric management mechanisms, and managing the prescribed nodes based on management information in accordance with the normal fabric management mechanism.

In a twelfth aspect according to the eleventh aspect, the fabric management mechanism allocates domain numbers for a fibre channel fabric to a plurality of switches inside one network domain, and by logically partitioning the fibre channel fabric, expands the number of nodes coupled to a single domain, and the fabric management mechanism creates a plurality of fabric management ports with respect to one physical port for managing the domain numbers in the plurality of fibre channel fabrics.

BRIEF DESCRIPTION OF DRAWINGS

FIG. 18 is a flowchart of processing for allocating a virtual domain ID to a bridge.

DESCRIPTION OF EMBODIMENTS

The embodiment of the present invention will be explained below based on the drawings. The present invention, as will be described below, makes a communication network that uses FCoE (an FCoE network) into a redundant configuration. In addition, the present invention reduces the scope of the impact of a failure no matter which fabric management mechanism this failure occurs in.

In the present invention, only the communication path related to the sending and receiving of a control command for maintaining the FCoE fabric changes when a failure occurs in the fabric management mechanism. In accordance with this, data I/O communications are resumed without changing the communication path used for data I/O. Therefore, it is not necessary for a data I/O to be switched to another system (such as another redundant domain). Accordingly, it is possible to realize failure processing by maintaining the data I/O communication performance as-is while using the communication bandwidth of the data I/O communication paths of both systems. The control traffic for maintaining the FCoE fabric here refers to the sending and receiving of requests and responses representative of logging in to a fabric, issuing a notification of a fabric status update, querying a nameserver, and regularly checking a virtual link, which will be described hereinbelow.

Figure 1:
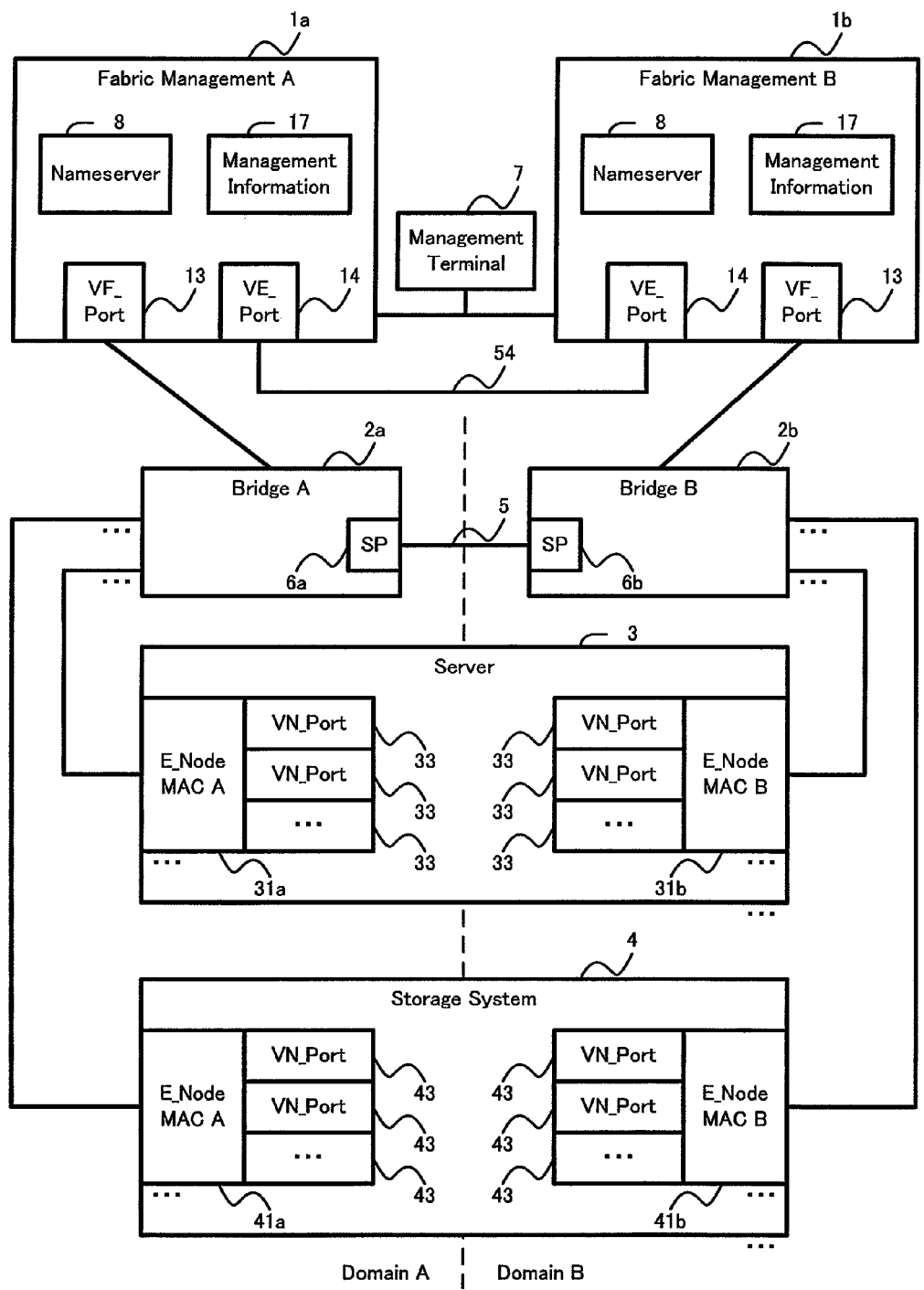
FIG. 1 is a diagram showing an overview of the first embodiment.

FIG. 1 is a schematic diagram showing an overview of this embodiment. In FIG. 1, an outline of the embodiment to the extent required to understand and implement the present invention is presented. The scope of the present invention is not limited to the configuration shown in FIG. 1.

The communication network control system shown in FIG. 1, for example, comprises a plurality of fabric management mechanisms 1a, 1b, a plurality of bridges 2a, 2b, at least one server 3, and at least one storage system 4.

The server 3 comprises at least one of the respective E_Nodes 31a, 31b, which are the communication interfaces of the FCoE. Similarly, the storage system 4 comprises at least one of the respective E_Nodes 41a, 41b, which are the FCoE communication interfaces. An E_Node is a fiber channel node that is able to transmit FCoE frames using one or more ENode MACs.

The fabric management mechanisms 1a, 1b comprise at least one Virtual F_Port (VF_Port) 13. The VF_Port is the data forwarding component of an FC entity that emulates an F_Port and is dynamically instantiated on successful completion of a fabric login (FLOGI) exchange. The term virtual indicates the use of a non-fibre channel link connecting a VF_Port with a VN_Port. The fabric management mechanism 1 comprises at least a conversion mechanism for creating a FCoE frame by encapsulating an FC frame into an FCoE frame, and for extracting the FC frame by decapsulating the FC frame into the FCoE frame, and a nameserver 8 that processes the control traffic for maintaining the FCoE fabric described herein below. The control traffic will be explained in detail below.

The fabric management mechanism 1 may possess either a switching mechanism for routing a FCoE frame on the basis of a destination Media Access Control (MAC) address, or a switching mechanism for routing on the basis of a FC frame destination N_Port_ID, a FC frame that decapsulated the FCoE frame. However, since the data I/O traffic sent and received between the server 3 and the storage system 4 is not included, it is not mandatory for the fabric management mechanism 1 to have a switching mechanism. The fabric management mechanism 1 will be explained in detail below.

The fabric management mechanism 1 comprises management information 17. The management information 17 holds information on the login request from the each E_Node, access control information such as FC zoning, and bridge information for managing an Ethernet bridge. The management information 17 is mutually communicated and shared either through the virtual E_Port (VE_Port) 14 via Inter Switch Link 54 or through a management network. The virtual E_Port is the data forwarding component of an FC entity that emulates an E_Port and is dynamically instantiated on successful completion of an exchange link parameter (ELP) exchange. The term virtual indicates the use of a non-fibre channel link connecting the VE_Ports. In accordance with the sharing of this management information, when a failure occurs in the one fabric management mechanism, it is possible for the other fabric management mechanism to quickly confirm the previous status of the E_Node information and bridge information logged into the failed fabric management mechanism. Also, the access control information is transferred to the other normal fabric management mechanism without an Administrator resetting the access control information that had been managed by the failed fabric management mechanism. The management information 17 will be explained in detail below.

The bridge 2 is a switch that possesses a mechanism for performing routing using a MAC address without the need for a function for managing the FCoE fabric. As a different aspect, the bridge 2 may also be a switch, which has a mechanism for encapsulating and decapsulating a FCoE Frame, and which comprises a FC switch mechanism that uses the sending N_Port_ID (D_ID) and the receiving N_Port_ID (S_ID) of a Fibre Channel header.

When the E_Node 31 requests a fabric login to the fabric management mechanism 1, a E_Node create Virtual N_Port (VN_Port) 33 instance. The VN_Port is the data forwarding component of an FC entity that emulates an N_Port and is dynamically instantiated on successful completion of an FLOGI or Discover Fabric Service Parameter (FDISC) exchange. The term virtual indicates the use of a non fibre cannel link connecting a VN_Port to a VF_Port. A Fabric management mechanism allocate the N_Port_ID to the VN_Port instance at this time. The N_Port_ID is an intrinsic ID inside the fabric, which is used as the source and destination ID in a FC frame encapsulated into FCoE Frame.

The E_Node of the server 3 and the storage system 4 are independently coupled to at least two communication networks to achieve a redundant communication network configuration. The one fabric management mechanism 1a is in charge of at least one network domain. The other fabric management mechanism 1b is in charge of at least one network domain. At least one bridge 2a, 2b is disposed in each domain.

The above-mentioned control traffic communicates with the fabric management mechanism 1 from the E_Node 31 and the E_Node 41 by way of the bridge 2. The data I/O traffic sent and received between the server 3 and the storage system 4 is communicated from the E_Node 31a to the E_Node 41a by way of the bridge 2a. In accordance with this, the data I/O traffic sent and received between the server 3 and the storage system 4 is not included in the above-mentioned control traffic. In other words, the control traffic for maintaining the FCoE fabric and the data I/O traffic sent and received between the server 3 and the storage system 4 are communicated using different paths.

The bridge 2a and a second bridge 2b are coupled via a physical link 5. The physical link 5 couples the bridge 2a to the bridge 2b, and in a case where the fabric management mechanisms 1a, 1b of the two systems are normal, the bridge 2 sets the ports 6a, 6b that couple to the physical link 5 to the standby port (Standby Port: abbreviated as SP in the drawing) mode, thereby making routing between the bridge 2a and the bridge 2b impossible. In a case where a failure occurs in the fabric management mechanism 1a, the bridge 2a detects the fact that communication with the fabric management mechanism 1a is not possible, and then bridge 2a change the status of the port 6a from standby (SP: Stand-by Port) to active (AP: Active Port).

The port 6b, which is the destination of the port 6a, changes the status of port to active from the standby mode. For example, the receiving terminal of the port 6a switches the status of the port 6b from the standby mode to active by detecting a change in the receiving status of the transceiver. As another means for changing the status of the port 6b from standby to active, the ports 6b are activated beforehand, and the prevention of routing between the bridge 2a and the bridge 2b may be made interchangeable by enabling only a communication for communicating either an active or a standby switching message. This will be explained in detail using the respective examples.

In a case where a failure occurs in the fabric management mechanism 1a, the E_Node detects that the keep alive request for regularly monitoring the login status of the fabric has timed out. The E_Node implicitly performs logout processing from the fabric in accordance with the keep alive timeout. When the E_Node logs out from the fabric, all VN_Port instances are deleted. Therefore, the sending and receiving of data I/O between the server 3 and the storage system 4 are terminated unless E_Node logs in the fabric once again.

The bridge 2a detects a failure in the fabric management mechanism 1a and activates the physical link 5 of the port 6a. In accordance with this, the control traffic, which each E_Node had communicated with the fabric management mechanism 1a, is switched to a path to the fabric management mechanism 1b via the physical link 5 from the bridge 2a. In accordance with this, the E_Node 31a and the E_Node 41a, which are coupled in the network topology A, log into the fabric once again, and re-create the VN_Port 33a and VN_Port 43 instances by communicating with the fabric management mechanism 1b.

In accordance with the above-mentioned steps, the VN_Ports of both the server 3 and the storage system 4, which are coupled in the network topology A, are re-created. In accordance with this, it is possible for data I/O traffic to resume. The data I/O traffic is sent from the E_Node 31a to the E_Node 41a via the bridge 2a at this time. The communication path of this data I/O remains the same as prior to the failure in the fabric management mechanism 1a. The same network bandwidth performance as prior to the failure is maintained in the fabric management mechanism 1a, making it possible for data I/O to continue between the server 3 and the storage system 4.

Example 1

Figure 2:
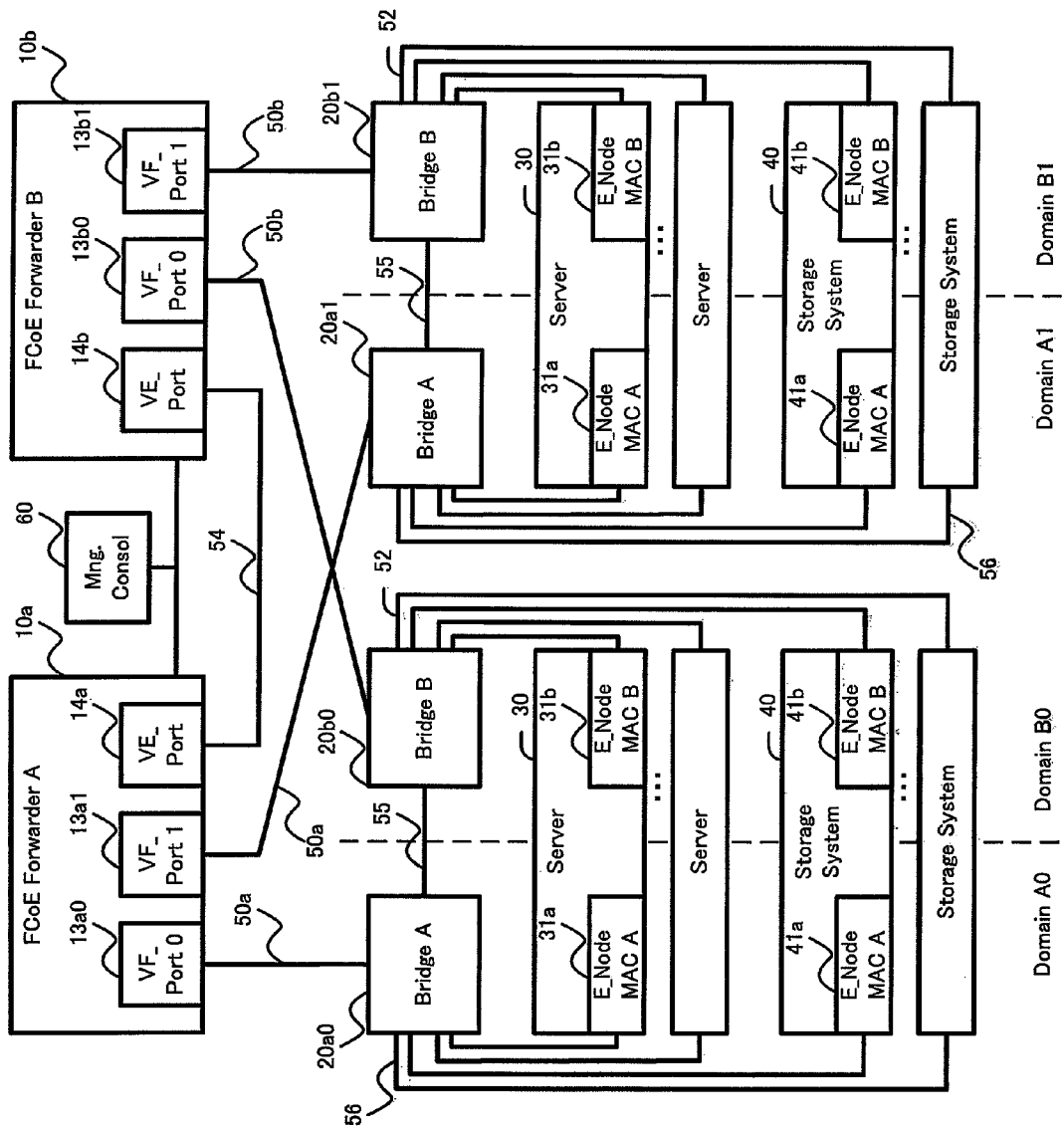
FIG. 2 is a diagram showing the overall configuration of a system.

FIG. 2 shows a communication network control system of this example. The system shown in FIG. 2 is redundantly configured using a domain A, which is managed by the FCoE Forwarder (FCF) 10a, and a domain B, which is managed by the FCoE Forwarder 10b. The FCF is a device that comprises a FC switching mechanism, a mechanism for managing the FC fabric, and control information. This FCF may also be a device that comprises a mechanism for managing the FC fabric and control information without having the FC switching mechanism as in FIG. 1.

Two arrays of computer apparatuses are provided. The computer apparatuses in this explanation signify either the server or the storage system. Each computer apparatus comprises separate E_Node MACs 31a and 31b that belong respectively to system A (called Domain A) and system B (called Domain B).

FCF 10a VF_Ports 13a0 and 13a1 are coupled to bridges 20a by way of physical links 50a. The bridge 20a is coupled to E_Node MACs 31a and 41a of system A comprising the respective computer apparatuses via a physical link 56. Therefore, the respective domain A nodes 31a and 41a are able to communicate with the FCF 10a via the domain A bridge 20a.

FCF 10b VF_Ports 13b0 and 13b1 are coupled to bridges 20b0 and 20b1 by way of physical links 50b respectively. The bridges 20b0 and 20b1 are coupled to E_Node MACs 31b and 41b of system B comprising the respective computer apparatuses via a physical link 52. Therefore, the respective domain B nodes 31b and 41b are able to communicate with the FCF 10b via the domain B bridge 20b.

A FCF 10a VE_Port 14a and a FCF 10b VE_Port 14b are coupled via a physical link 54. The FCF 10a and the FCF 10b exchange management information via the VE_Port 14a, the physical link 54 and the VE_Port 14b.

In addition, the domain A0 bridge 20a0 and the domain B0 bridge 20b0 are coupled by a physical link 55. The domain A1 bridge 20a1 and the domain B1 bridge 20b1 are coupled by another physical link 55. The respective physical links 55 are in the standby mode when both the FCF 10a and FCF 10b are normal operation, and the communication path between the bridge 20a and the bridge 20b is not active.

In a case where a failure occurs in either of the FCFs 10a or 10b, bridge A detects the failure condition and bridge A activates the physical link 55 to enable communications from the bridge 20a to the bridge 20b. This physical link 55 is used in a case where a failure occurs in either of the FCFs 10a or 10b or in either of physical links 50a or 50b, and it becomes impossible to communicate control traffic between the FCF and the E_Node. For example, in a case where a failure occurs only in the physical link 50a path, only domain A0 is affected by this failure, and as such, only the physical link 55 between the bridge 20a0 and the bridge 20b0 is changed status from stand-by to active.

Each bridge 20 (a0, a1, b0, b1) is a switch that has a mechanism, which performs routing using a MAC address that denotes the source and destination in the header. As a different aspect, the bridge 20 may be a FCoE switch, which comprises mechanisms for decapsulating a FC frame into FCoE Frame, performing routing using a transmission port ID (D_ID) and a reception port ID (S_ID) in the Fibre Channel header, and thereafter, encapsulating the FC frame into FCoE Frame once again. However, the bridge 20 does not require to have a fabric management mechanism.

The configurations of the FCFs 10a and 10b, a server 30 and a storage system 40 will be described hereinbelow. Further, when there is no need to distinguish between the domain A and the domain B, the FCFs 10a and 10b may be called the FCF 10, and the bridges 20a and 20b may be called the bridge 20.

In a case where a FCF failure occurs in a configuration like that of FIG. 2, it is necessary to create twice as many VN_Port instances from the E_Node in a single normal FCF than there were prior to a switchover. The N_Port ID must be unique to the one FCF or fabric management mechanism. In the present invention, when the N_Port ID is allocated in the configuration of FIG. 2, a virtual ID allocation, which will be described below, is also utilized. In accordance with this, it is possible to realize FCF switching even in a large-scale FCoE network configuration.

Figure 3A:
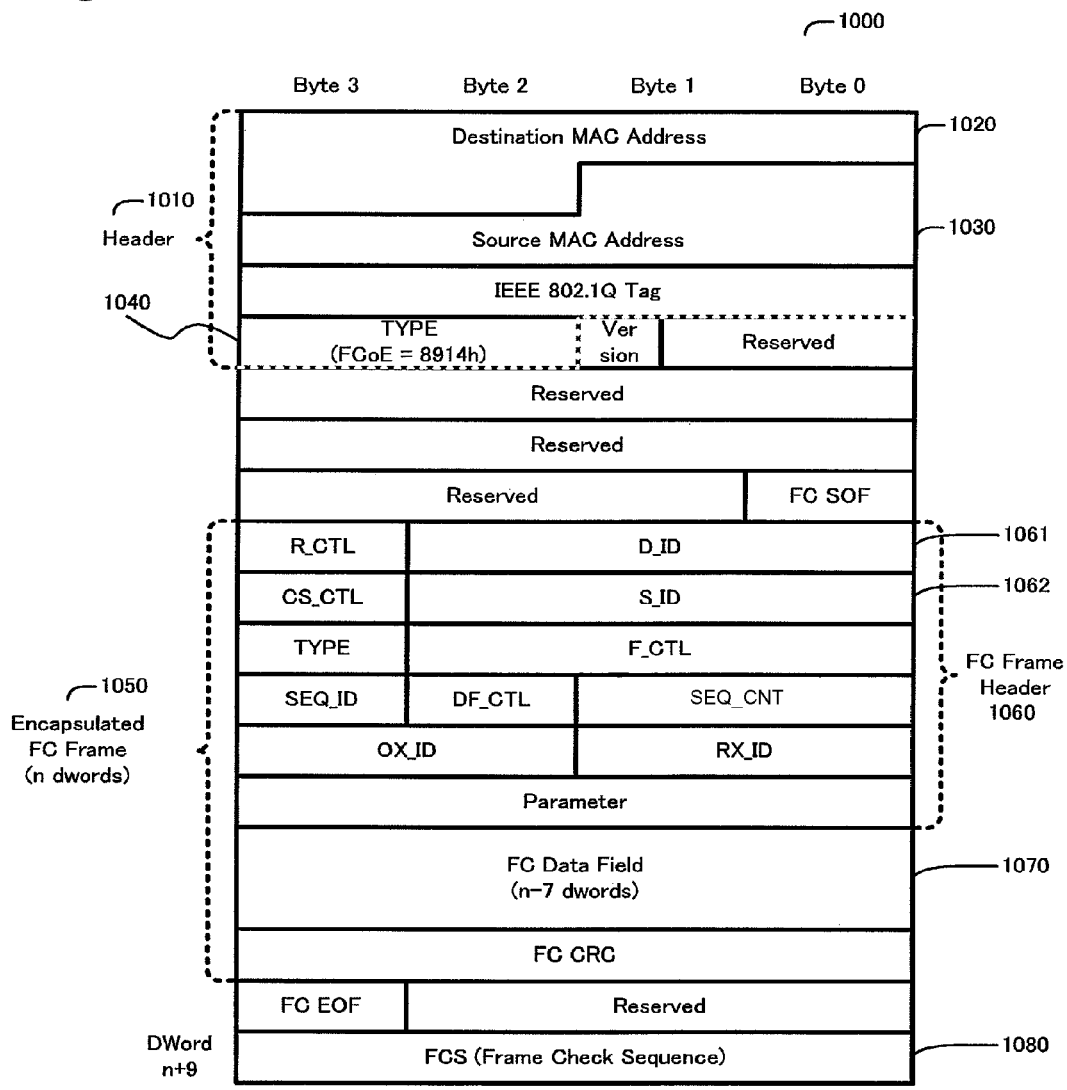
FIG. 3a is a diagram showing an FCoE frame and a FIP frame.

FIG. 3a shows a FCoE frame structure. In FIGS. 3a, 3b, 3c and 3d, R_CTL stands for routing control, CS_CTL stands for class specific control, DF_CTL stands for data field control, SEQ_ID stands for sequence ID, SEQ_CNT stands for sequence count, OX_ID stands for originator exchange-identifier, RX_ID stands for response exchange-identifier, FC EOF stands for fibre channel end of frame and FC SOF stands for fibre channel start of frame.

The FCoE frame 1000 comprises an Ethernet header 1010, and an encapsulated FC frame 1050. The FC frame 1050 comprises a FC frame header 1060, a FC data field 1070, and a FC frame CRC (Cyclic Redundancy Check). The header 1010 comprises a destination MAC address 1020 for identifying the destination of the FCoE frame 1000, a source MAC address 1030 for identifying the source of the FCoE frame 1000, and a Type 1040 that denotes the frame type. The FCoE frame 1000 comprises a FCS (Frame Check Sequence) 1080, which is the CRC (Cyclic Redundancy Check) for the entire FCoE frame. In the case of the FCoE frame, the Type 1040 comprises a fixed value denoting the FCoE frame.

Figure 3B:
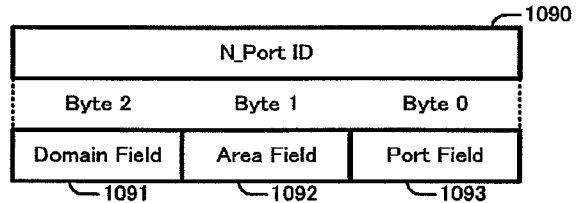
FIG. 3b is a diagram showing an FCoE frame and a FIP frame.

FIG. 3b shows the structure of the N_Port ID 1090. The N-Port ID 1090 comprises a domain field 1091, an area field 1092, and a port filed 1093.

Figures 3C, 3D:
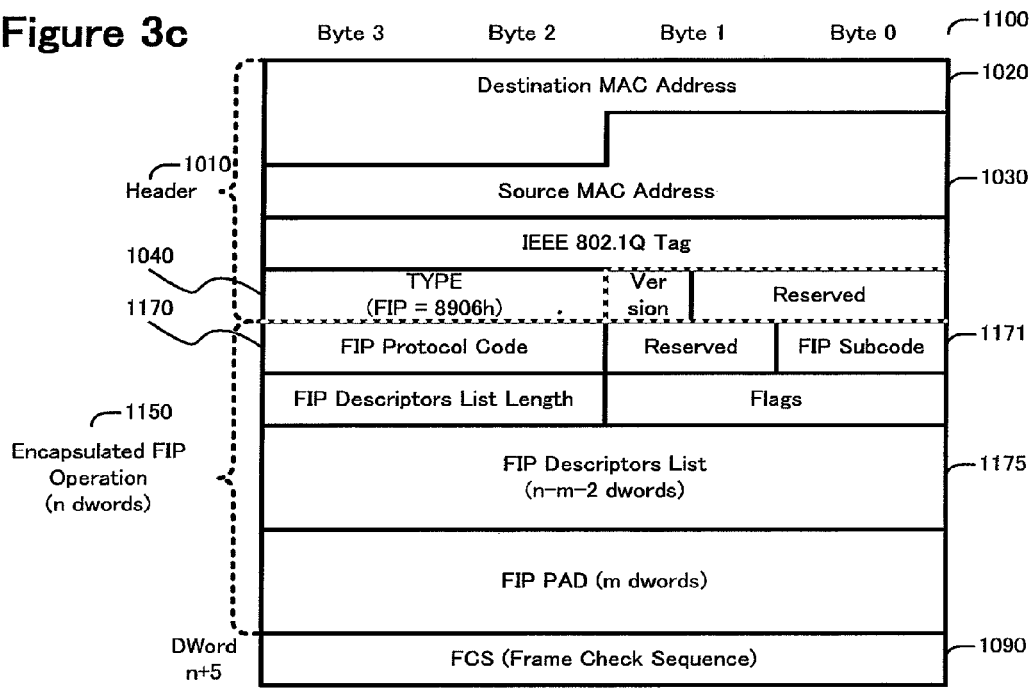
FIG. 3c is a diagram showing an FCoE frame and a FIP frame.
FIG. 3d is a diagram showing an FCoE frame and a FIP frame.

FIG. 3c shows an FIP (FCoE Initialization Protocol) frame structure. The FIP frame 1100 comprises an Ethernet header 1010 and encapsulated FIP operation 1150. The FIP operation 1150 comprises a FIP protocol code 1170, a FIP subcode 1171, and a FIP descriptor list 1175. In the FIP descriptor list 1175, for example, there is stored a plurality of lists of descriptors for sending and receiving a format of a FC extended link service that is needed at fabric login. An explanation of the detailed format of the FIP descriptor list 1175 will be omitted. The header 1010 comprises the destination MAC address 1020 for identifying the destination MAC address of the FIP frame 1100, a source MAC address 1030 for identifying the source MAC address of the FIP frame 1100, and a type 1040 denoting the frame type. The FIP frame 1100 comprises a FCS 1090, which is the CRC (Cyclic Redundancy Check) for the entire FIP frame. In the case of a FIP frame, the type 1040 comprises a fixed value denoting the FIP frame.

FIG. 3d shows a table of FIP operation codes of the FIP frame. FIG. 3d comprises the FIP protocol code 1170, the FIP subcode 1171, and a FIP operation 1172. There are six major kinds of protocol codes for the FIP operations. These include discovery operations 1181 and 1182 for retrieving a FCF, operation codes 1183 and 1184 for carrying out a fabric login (FLOGI) request and response for creating a VN_Port instance, a fabric discovery (FDISC), a logout (LOGO), and an exchange of parameters between the VE_Ports (Exchange Link Parameter (ELS)), a FIP keep alive operation 1185 for confirming the state of the path between the E_Node and the FCF, and between a FCF and a FCF, an operation 1186 for clearing a virtual link, operations 1188 and 1189 for acquiring a tag number for a VLAN (virtual LAN), an operation 1189 that defines the vendor, and a reservation 1190 for future expansion.

Figure 4:
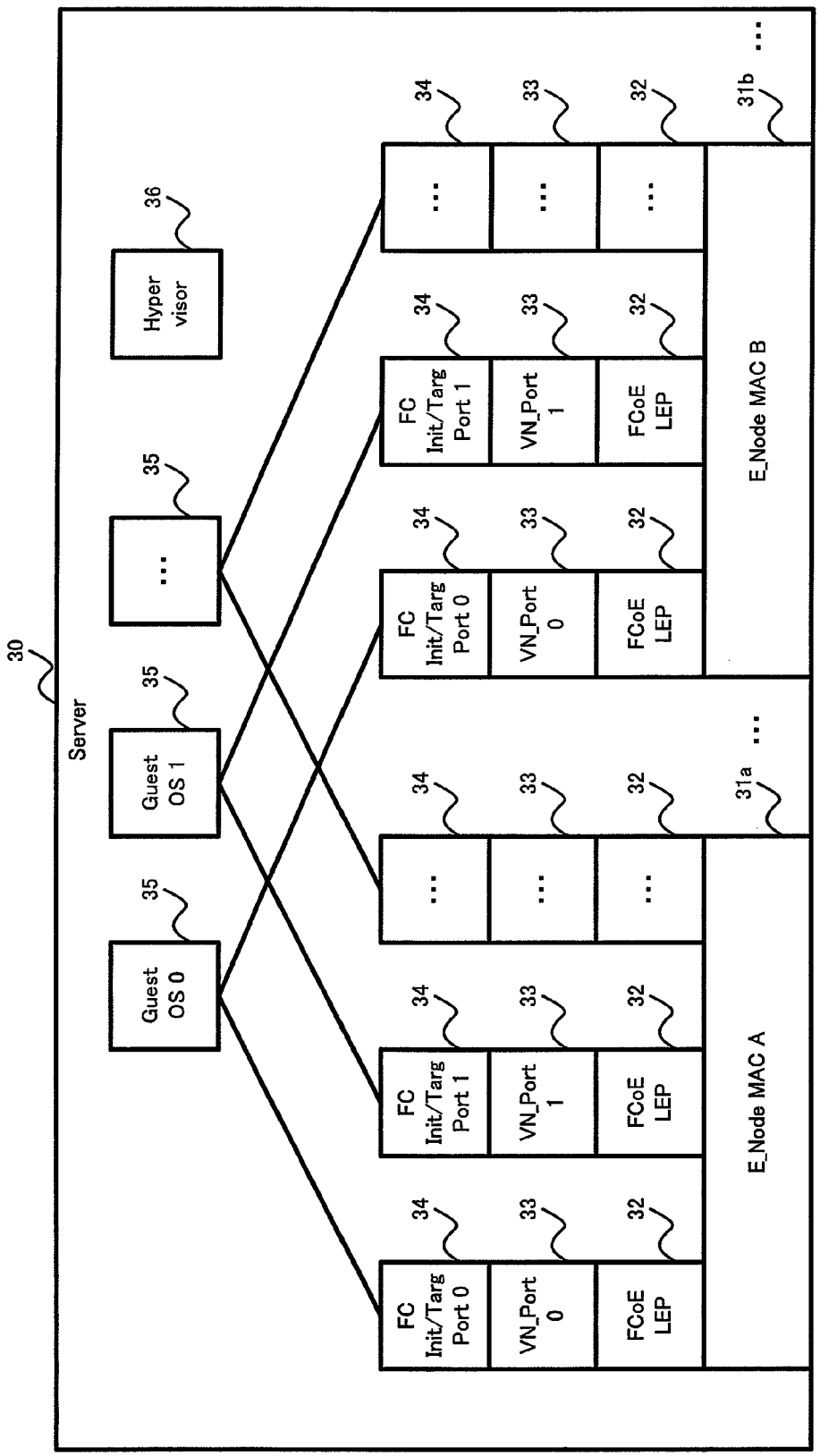
FIG. 4 is a diagram showing the configuration of a server.

FIG. 4 shows an example of the configuration of the server 30. In FIG. 4, FCoE LEP stands for fibre channel over ethernet link end-point. The FCoE LEP is the data forwarding component of an FCoE entity that handles FC frame encapsulation/decapsulation and transmission/reception of encapsulated frames through a simple virtual link. The server 30 comprises an E_NodeMAC31, a FCoE LEP 32, a VN_Port 33, a FC port 34, a guest OS 35, and a hyper visor 36.

The E_Node MAC 31 signifies the Ethernet MAC inside the E-Node. A global MAC address is allocated to the E_Node MAC 31 for retrieving a FCF (FIP Discovery) and for communicating with the FCF 10 at fabric login (FIP FLOGI).

The FCoE LEP 32 is a function for encapsulating a FC frame into an FCoE frame, and for decapsulating the FC frame into the FCoE frame. That is, the fabric management mechanisms 10a and 10b are configured as FCF that are used in a communication network to which the FCoE is applied. Furthermore, a FCoE LEP 32 is disposed between each of the ports (the VN_Port, the VF_Port, and the VE_Port) and the E_Node MAC.

The VN_Port 33 is coupled to the E_Node MAC 31 by way of the FCoE LEP 32. The VN_Port 33 is equivalent to the N_Port in the FC. The FC port 34 is either an initiator port or a target port. As a result of this, a plurality of VN_Ports 33 are able to be disposed on a single E_Node MAC 31.

In the example of the drawing, the guest OS 35 runs on the hyper visor 36. The hyper visor 36 is a program, which associates each guest OS 35 with the redundantly configured FC port 34 on a one-to-one basis. In this example, the FC Port 0, which is coupled to the E_Node MAC A, and the FC Port 0, which is coupled to the E_Node MAC B, are associated with the guest OS 0.

Figure 5:
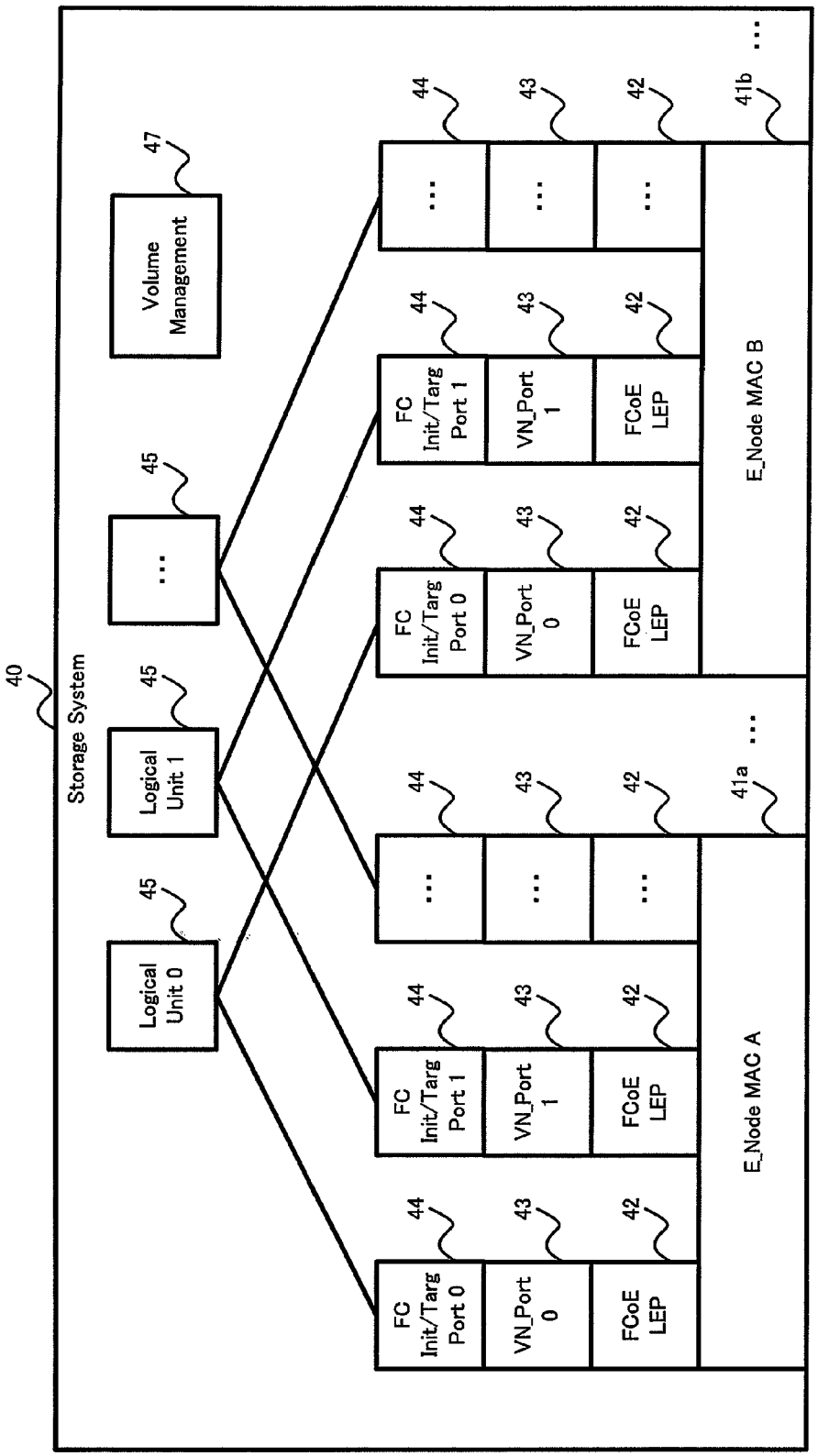
FIG. 5 is a diagram showing the configuration of a storage system.

FIG. 5 shows an example of the configuration of the storage system 40. The storage system 40, for example, comprises an E_Node MAC 41, a FCoE LEP 42, a VN_Port 43, a FC port 44, a logical unit 45, and a volume management part 47.

Since the E_Node MAC 41, the FCoE LEP 42, the VN_Port 43, and the FC port 44 are the same as the E_Node MAC 31, the FCoE LEP 32, the VN_Port 33, and the FC port 34 described in FIG. 4, explanations of these components will be omitted.

The logical unit 45, for example, is created using a physical storage device that is able to read/write from/to a hard disk drive or the like. Each logical unit 45 is coupled to a plurality of FC ports 44 in order to achieve a redundant configuration. The volume management part 47 is a program for associating on a one-to-one basis the redundantly configured FC ports 44 with the respective volumes. In this example, the FC Port 0, which is coupled to the E_Node MAC A 41a, and the FC Port 0, which is coupled to the E_Node MAC B 41b, are associated with the logical unit 0.

Figure 6:
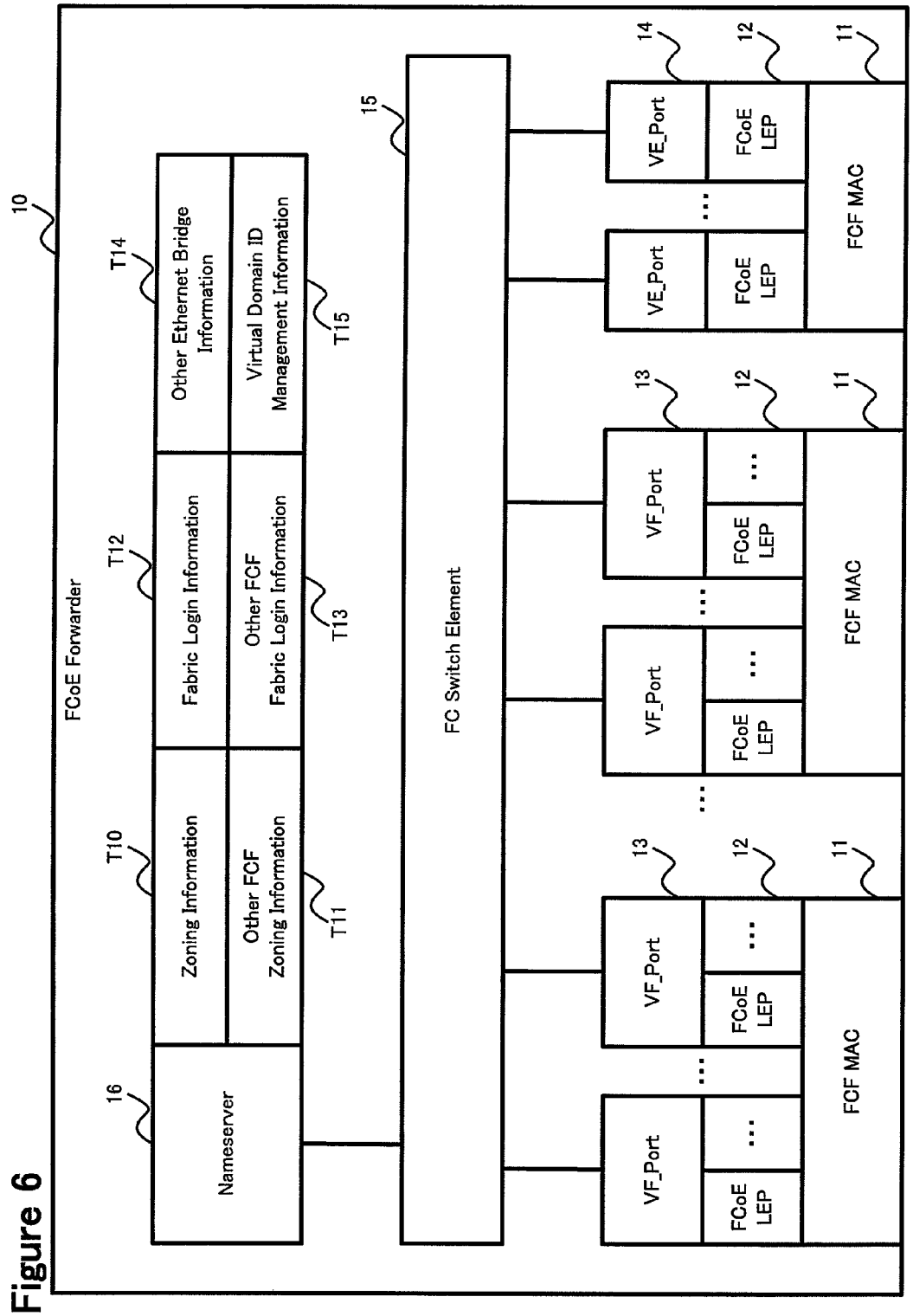
FIG. 6 is a diagram showing the configuration of an FCF.

FIG. 6 shows an example of the configuration of the FCoE Forwarder (FCF) 10. The FCF 10, for example, comprises a FCF MAC 11, a FCoE LEP 12, a VF_Port 13, a VE_Port 14, a FC switch element 15, and a nameserver/fabric manager 16.

The FCF MAC 11 is a physical coupling port. A plurality of VF_Ports are able to be disposed on the FCF MAC 11. FCoE LEP instances proportional to the number of VN_Port instances logged in the VF_Port are created in each VF_Port. The FC switch element 15 controls communications via the respective VF_Ports 13. The FC switch element 15 is coupled to the nameserver/fabric manager 16.

In this example, the FCF comprises a FC switch element, making possible communications with the respective VF_Ports. Instead of this, it is also possible to replace the FCF with a fabric management mechanism. In this case, the structure should be such that direct communications are possible between the respective VF_Ports and between the VF_Ports and the nameserver. In a shortcut communication that makes it possible to communicate a data I/O without going through the FCF, there is no need to have at least one or more FCF inside the domain.

The nameserver 16, for example, comprises a name service that associates a WWN (World Wide Name) with the FC N_Port, and a FC zoning function. The nameserver 16 manages the management information T10 through T15. The management information T10 through T15 is stored in a memory inside the FCF 10.

The management information, for example may include own-device zoning information T10, other-system-domain FCF-managed zoning information T11, own-device fabric login information T12, other-system-domain FCF-managed fabric login information T13, information T14 for managing the bridges 20a and 20b, and information T15 for managing a virtual domain ID. The virtual domain ID management information T15 will be explained using another example.

The zoning information T10 and T11 is access control information for determining whether or not the server 30 is permitted to access the storage system 40. In a case where a failure occurs in the other FCF, the FCF stores the zoning information T11 of the FCF of the other system domain in order to take over management of the other FCF domain.

The fabric login information T12 and T13 is for managing the login of each E_Node to the VF_Port. In a case where a failure occurs in the other FCF, the E_Node that was logged in to the other FCF detects the fact that a re-login has been performed to the FCF, and the FCF stores the fabric login information T13 of the FCF of the other system domain in order to confirm that the VN_Port instance of the E_Node is configured the same as prior to the failure.

The bridge information T14 and Virtual Domain ID management information T15 are for managing the bridges 20a and 20b in order to allocate a virtual domain ID.

Figure 7:
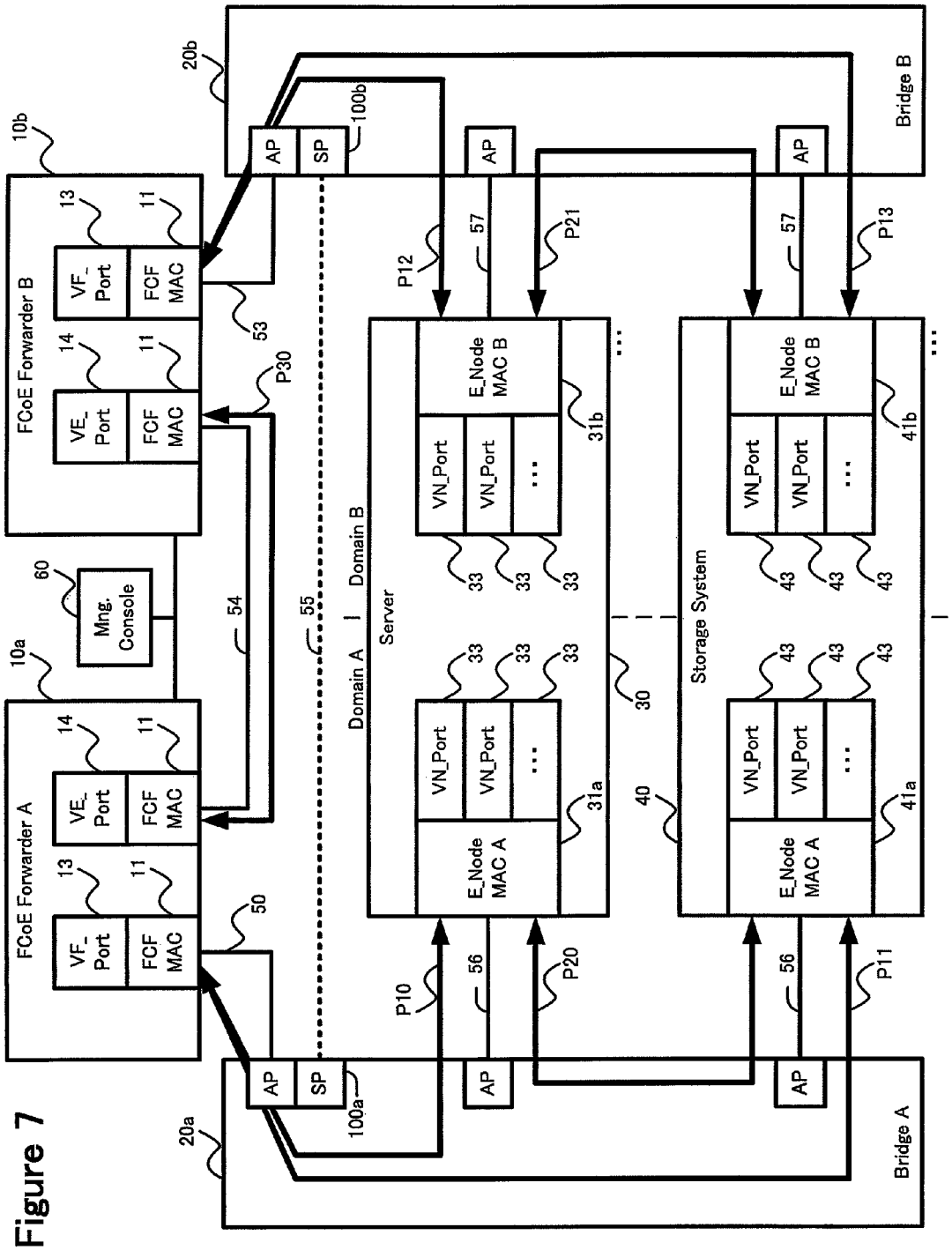
FIG. 7 is a diagram showing a communication path under normal circumstances.

FIG. 7 shows a case in which the communication network is in the normal state. In the case of a normal state, communication using the physical link 55, which couples the bridge 20a that belongs to domain A and the bridge 20b that belongs to domain B, is in the standby mode. The port 100a of the bridge 20a and the port 100b of the bridge 20b are in the standby mode.

The FCFs 10a and 10b are coupled via the physical link 54 that couples the respective VE_Ports 14 of the FCF MAC 11. The physical link 54 path that couples the respective VE_Ports 14 of the FCF MAC is called the inter-FCF communication path P30. The FCFs 10a and 10b exchange management information with each other via the communication path P30.

The E_Node MAC 31a of the server 30 that belongs to the domain A carries out management communications with the VF_Port 13 of the FCF 10a via a communication path P10 by way of the bridge A. The E_Node MAC 41a of the storage system 40 that belongs to the domain A carries out management communications with the VF_Port 13 of the FCF 10a via another communication path P11. The above-mentioned management communications is for sending and receiving the type of FIP Frame 1100 of the FIP operation 1172 of FIG. 3c. The management communications between the FCF 10 and the E_Node MAC 31 and 41 is used in the step that sends an extended FIP operation for determining the propriety of a shortcut operation and the step for regularly sending a FIP keep alive to monitor the login state when the E_Node MAC logs in to the FCF and creates VN_Port instances. In accordance with the extension of the FCoE protocol in the future, an extended FIP operation that is either communicated between the FCF and the E_Node or between the FCF and the VN_Port could be defined anew, but this path will also be defined the same as the communication paths P10 and P11. Since the extended FIP operation is undecided at the present point in time, it is notated in FIG. 3d as reserved.

To register the detailed information of the E_Node and VN_Port in the FCF nameserver, communications that make use of the FCoE frame in FIG. 3a may also be implemented. Since the FCF possesses a FC switch element, it is also possible to communicate with the domain B from the communication path P10 by way of the FC switch element and the communication path P30, but since the domain A and the domain B are used for making the system redundant in the configuration of FIG. 7, this path is access restricted by the zoning function. Since the FCF does not have a FC switch element in a case where the FCF is the fabric management mechanism, the VE_Port is used to send and receive the FCF management information, and the routing of a FCoE frame and FIP Frame from the VF_Port to the VE_Port to communicate E_Node MAC A of Domain A to E_Node MAC B of Domain B is not performed.

Communications between the VN_Port 31a of the server 30 and the VN_Port 41a of the storage system 40 uses the communication path P20, which goes from the server 30 E_Node MAC 31a by way of the bridge A and through the E_Node MAC A41a of the storage system 40. This communication path P20 is used to send and receive the FCoE frame and the FIP frame. The communication path P20 between the VN_Port and the VN_Port uses the FCoE frame to carry out sending and receiving to perform a port login (PLOGI), a process login (PRLI), and thereafter a data I/O communication (for example, a FCP: Fibre Channel Protocol, which is the protocol for sending and receiving a SCSI transaction). Also, the communication path P20 between the VN_Port and the VN_Port may also use the FIP frame to send and receive a FIP keep alive, which is sent and received to regularly monitor the propriety of communications via the communication path P20 between the VN_Port and the VN_Port that performed port login, and other communications. In accordance with the extension of the FCoE protocol in the future, an extended FIP operation, which is either communicated between the E_Node of a server and the E_Node of a storage, between the E_Node and the VN_Port, or between the VN_Port and the VN_Port could be defined anew, but this path will also be defined the same as the communication path P20. Since the extended FIP operation is undecided at the present point in time, it is notated in FIG. 3d as reserved.

The E_Node MACs 31b and 41b of the domain B are coupled to the FCF 10b via communication paths P12 and P13, and management communication is performed using this communication paths P12 and P13. A data I/O is communicated between the server 30 and the storage system 40 using a communication path P21. Since the domain B is the same as the domain A, detailed explanations of the domain B communication paths will be omitted. Since the operations of the domain B are the same as those of the domain A, the operations of the domain A will be explained below.

In a case where the management communications between the E_Node MACs 31a and 41a, and the VN_Ports 33 and 43 and the VF_Port 13 are not established, the E_Node, which detects the failure in the management communications, determines that a logout from the fabric was performed implicitly, and the VN_Port instances are deleted. Because the VN_Port required for a data I/O communication has been deleted in accordance with the failure of the management communication between the FCF and the E_Node, it becomes impossible to carry out communications between the VN_Port and the VN_Port via the communication path P20.

Specifically, in a case where a response to either a FIP keep alive or an extended FIP operation, which is sent and received either between the FCF and the E_Node or between the FCF and the VN_Port of the E_Node using the communication paths P10 and P11, is not returned from the FCF with a prescribed period of time, a timeout error occurs. When the timeout error occurs, the E_Node determines that an implicit logout from the fabric has been performed. All the E_Node, which logged into the failure FCF, deletes all the VN_Port instances. As a result of this, the communication path P20 from the VN_Port and the VN_Port is lost, and the data I/O communication becomes to terminate. However, a failure has not occurred in the physical path 56 for coupling the server 30 and the storage system 40 with the bridge A (20a), and as such, the communication path P20 can be used between the E_Node 31a and the E_Node 41a.

Therefore, in a case where the E_Node is able to re-create VN_Port instances, it is possible to resume the communication of the communication path P20 from the VN_Port 33 to the VN_Port 43. That is, a failure has not occurred in the communication path P20, but all the VN_Ports required for a domain A data I/O communication have been deleted by the E_Node logout determination, and the domain A data I/O communication is terminated. That is, the FCF 10 is not directly routing the data I/O communication traffic, but because the FCF 10 is involved in the creation and maintenance of the VN_Ports, the FCF is required for maintaining the data I/O communication.

Figure 8:
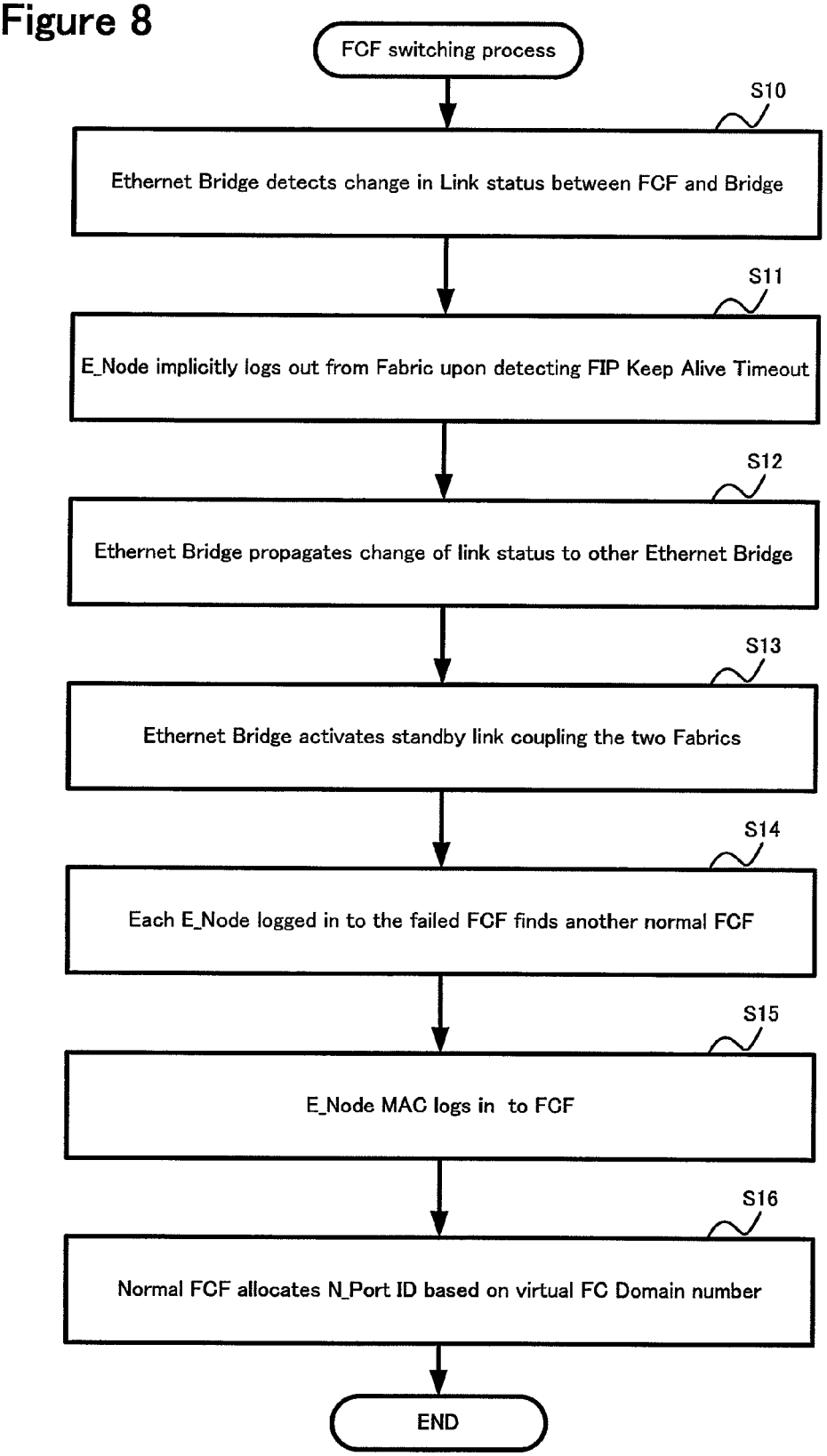
FIG. 8 is a flowchart showing a process for switching the FCF.
Figure 9:
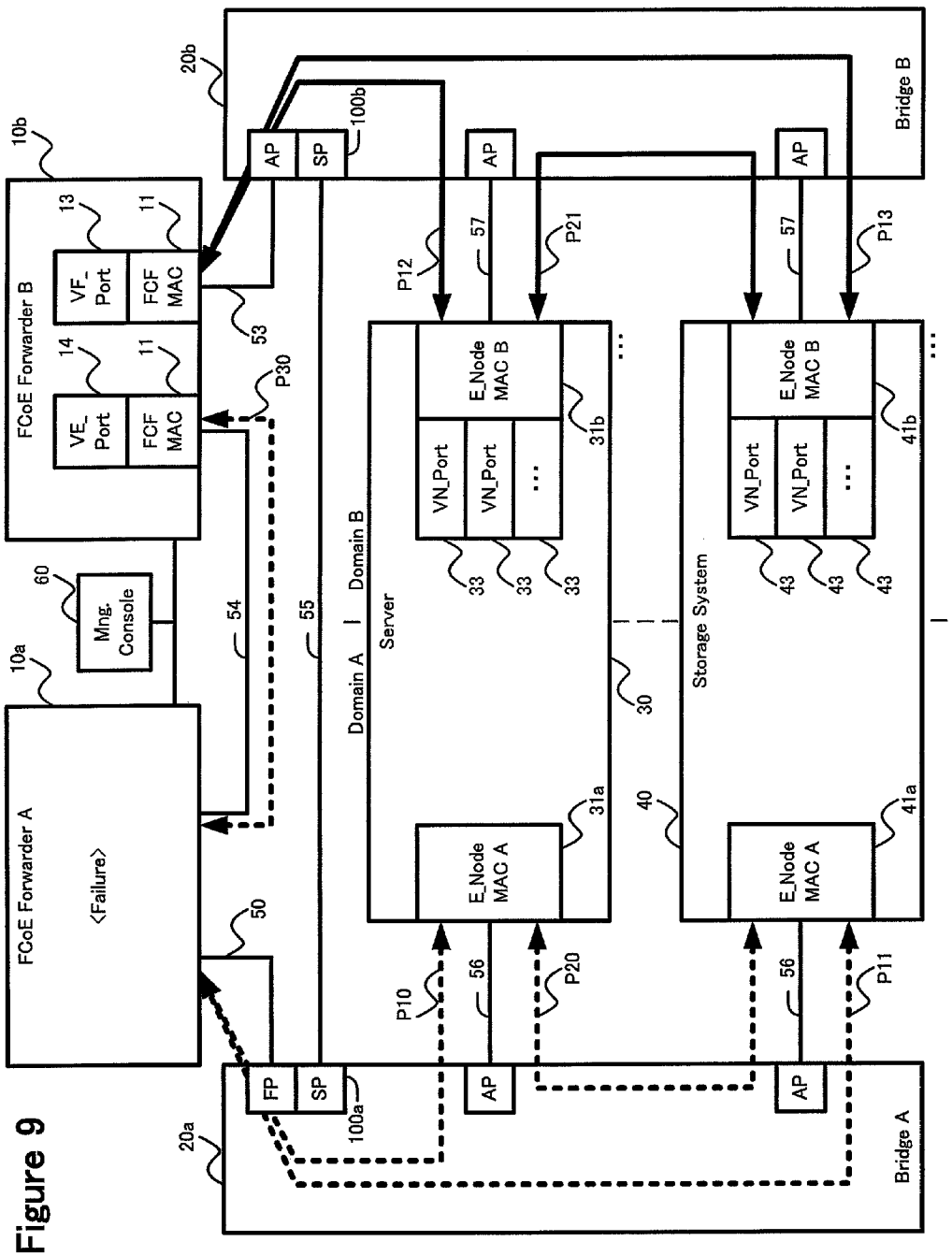
FIG. 9 is a diagram showing what happens when a failure occurs in the one FCF.
Figure 10:
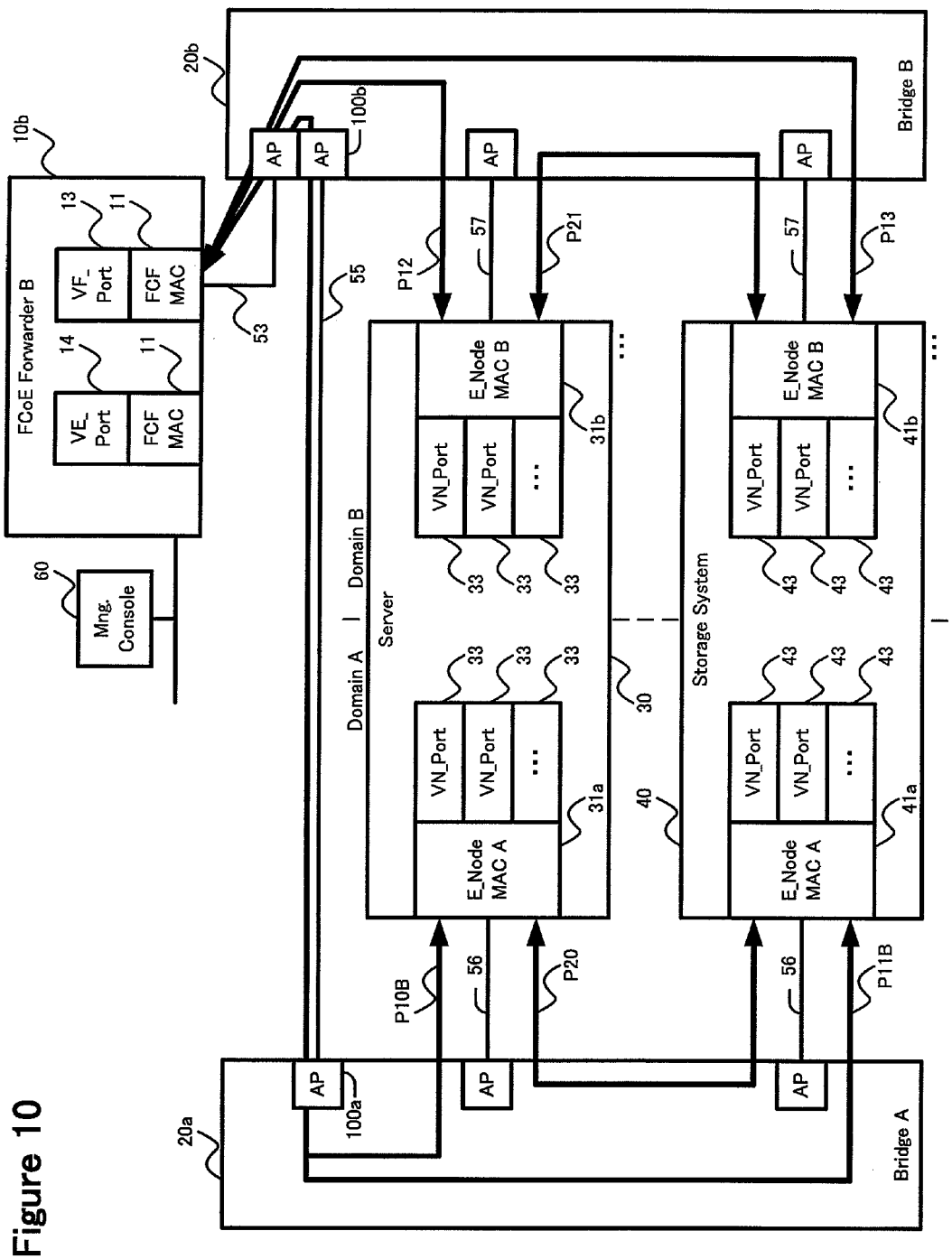
FIG. 10 is a diagram showing how the system recovered from the failure.

FIG. 8 is a flowchart showing the processing for taking over management communication with the other FCF when a failure has occurred in the one FCF, or when a link failure occurs between the FCF and the bridge. FIG. 9 shows the state of the communication network when a failure has occurred in the FCF A. FIG. 10 shows how domain management is handed over from the failed FCF A to the normal FCF B. A case in which a failure has occurred in the FCF 10a of the domain A, and the management communication that was being performed by the domain A is taken over by the FCF 10b of the domain B.

When FCF 10a is occurred a failure, the bridge 20a detects a change in the link status between the FCF 10a and the bridge 20a (S10). When the E_Node MACs 31a and 41a, which had been logged into the FCF 10a, detect a timeout in the FIP keep alive response, these E_Node MACs 31a and 41a implicitly log out of the fabric (S11). In accordance with this, as shown in FIG. 9, the communication path P10, the communication path P11, and the communication path P20 between the VN_Port and the VN_Port is cleared. Furthermore, the inter-FCF communication path P30 also is cleared as a result of the failure of the FCF 10a.

The bridge 20a propagates the change of the link state detected in S10 to the other bridge 20b (S12). A standby link, which is disposed on the physical link 55 that couples the bridge 20a and the bridge 20b, becomes usable in accordance with a procedure that will be described below (S13). In accordance with this, as shown in FIG. 10, the system A domain and the system B FCF 10b are coupled via new management communication paths P10b and P11b. The communication paths P10b and P11b are coupled to the FCF MAC 11 of the FCF 10b in accordance with the standby link 55 being activated.

A method for detecting a change in the link status between the FCF 10a and the bridge 20a will be explained. It is possible to detect a change the status of the port from active to failure (FP: Failure Port), which is the coupling destination of the physical link 50. Or, as another method, a change in the link status can also be determined by regularly sending and receiving a packet that confirms the viability of a Ping (ICMP: Internet control message protocol) or the like between the bridge and the FCF. Or, it is also possible to detect the fact that the bridge A is unable to communicate with the FCF A by looking for a change in the bridge information, which will be explained below. It is supposed that the bridge A has been set beforehand such that the standby port (SP) 100a transitions to the active mode when it is not possible to communicate with the FCF A.

A means for the bridge 20b to change the standby mode port 100b to active will be explained. When the port 100a is activated and a transmission signal is outputted, the receiving terminal of the port 100b, which is the coupling destination of the physical link 55, detects a change in the reception status of the transceiver. In accordance with this, the status of the port 100B is switched from the standby mode to active.

As another means, there is also a method in which the ports 100a, 100b of the bridges in the two domains are activated beforehand during normal operation, and routing between the bridge 20a and the bridge 20b is prevented by only permitting a communication for communicating either an active or standby switching message. The configuration may be such that when a failure is detected in the FCF, the physical link 55 is logically activated and a message is sent and received so as to enable communications between the domain A and the domain B.

The E_Node MACs 31a and 41a, which belong to the domain of system A in which a failure has occurred, use the FIP Frame to discover a new FCF 10b (S14). The discovery 1181 and 1182 FIP operations of FIG. 3d are used in the FCF note issuing step. The FCF sends a response containing a MAC address or the like for communicating with the FCF VF_Port to the E_Node MAC. An explanation of the communication contents will be omitted.

The E_Node MACs 31a and 41a of the domain A login to the FCF 10b, and create a VN_Port instance (S15). More specifically, the E_Node MACs 31a, 41a send a FIP FLOGI request (first time only) 1183 and a FIP N_Port ID Virtualization (NPIV) FDISC request (on and after the second time) 1184 to the VF_Port 13 of the FCF 10b.

The FCF 10b, upon receiving either the FIP FLOGI or the NPIV FDISC, allocates a unique N_Port ID to the VN_Port, and responds with a FIP Response 1184. Specifically, in the network configuration of FIG. 17 in Example 4, which will be explained below, a number of E_Nodes that exceed the upper limit of the area ID 1092 of the N-Port ID 1090 of FIG. 3B exist in a single network. For this reason, in Example 4, which will be explained below, either the FCF or the fabric management mechanism virtually allocates a FC domain number to each bridge. Therefore, in the S16, the FCF uses the virtual FC domain number that has been allocated to the bridge, which is coupled to the E_Node via a direct physical link, to create a N-Port ID, and responds with the FIP response 1184 (S16). The step for allocating the virtual domain FC domain number will be explained using Example 4.

The E_Node, in accordance with this, creates the required number of VN_Port instances. At this time, the N_Port ID of the VN_Port of the E_Node may use the information of the failed FCF to allocate the same value, or may allocate a different N_Port ID. This is because the zoning information is generally configured using WWN, and does not rely on the N_Port ID, which is allocated to the VN_port WWN. Hypothetically, in a case where zoning makes use of the N_Port ID, the FCF uses the login information of the failed FCF to make it possible to facilitate the recovery of the zoning configuration by allocating the same N_Port. ID to the same WWN.

Figure 11:
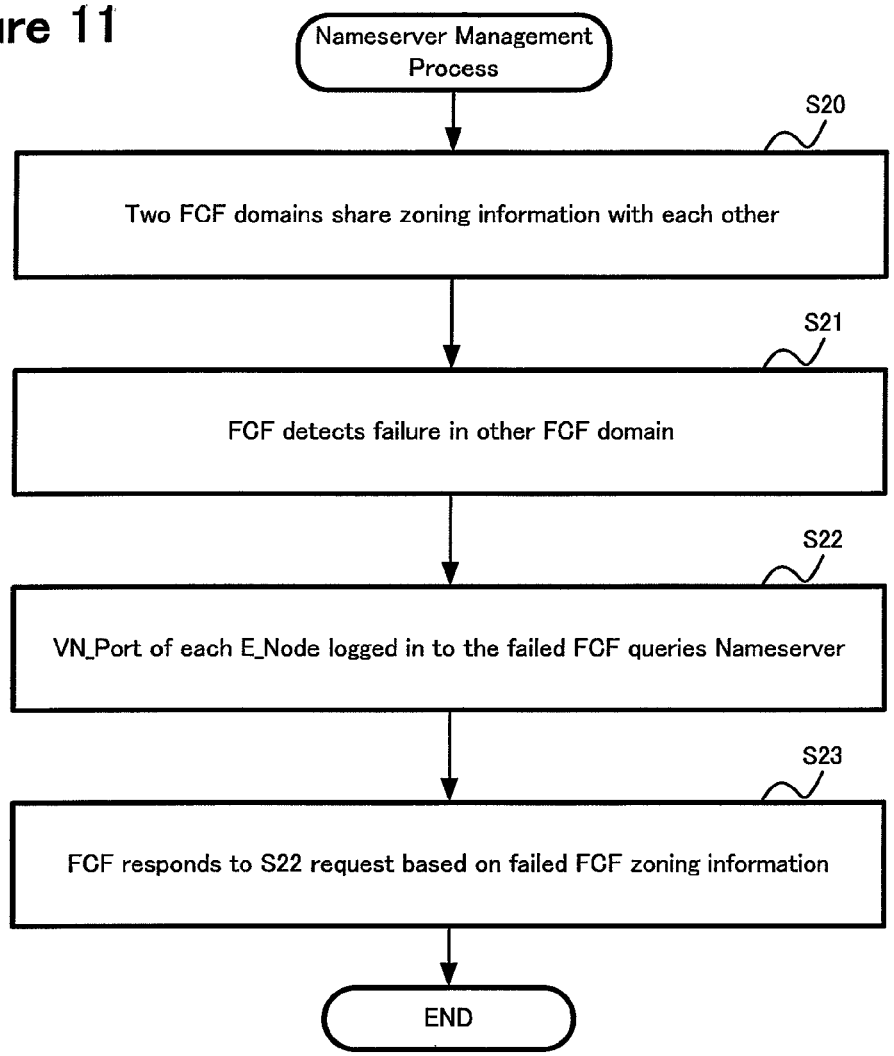
FIG. 11 is a flowchart showing nameserver management processing.

FIG. 11 is a flowchart showing a nameserver management process. This process is implemented by each VN-Port subsequent to a VN_Port instances having been created in accordance with the E_Node login process of FIG. 8. That is, in a case where the E_Node creates a plurality of VN_Port instances, the FIG. 11 processing is implemented a plurality of times for the processing of FIG. 8. The processing of FIG. 11 is able to be performed in parallel by the respective VN_Ports.

The FCFs 10a and 10b exchange and share the zoning information T10 and T11 with each other when the FCF are normal (S20).

The FCF 10b knows that a failure has occurred in the other FCF 10a by learning either of a response timeout that has occurred for the FIP keep alive communicated with the VE_Port, or of a change in the physical link 55 (S21).

The E-Node MACs 31a, 41a of the domain A issue login requests to the FCF B, and the FCF B returns login responses to the respective sources. The processing from the time the failure occurred until the login process is as was explained using FIG. 10, and as such, the details will be omitted. The VN_Port of the E_Node A, for which the login process was successful, acquires a list of logged in N_Ports, and sends a query request to the FCF B nameserver (S22). This query request is sent and received via the FCoE frame using the communication path P10B (FIG. 10), which accesses the nameserver from the VN_Port via the VF_Port.

The FCF 10b, upon receiving the query request to the nameserver from the VN_Port 33, determines whether or not to permit access on the basis of the zoning information T11 related to the domain A, and consequently responds with a list of N_Port IDs of accessible VN_Ports (S23). That is, the same as the access control in accordance with the zoning information at the time of domain A login, the FCF 10b is able to restore the VN_Port that can communicate with a certain VN_Port by using the zoning information shared from the failed FCF.

Figure 12:
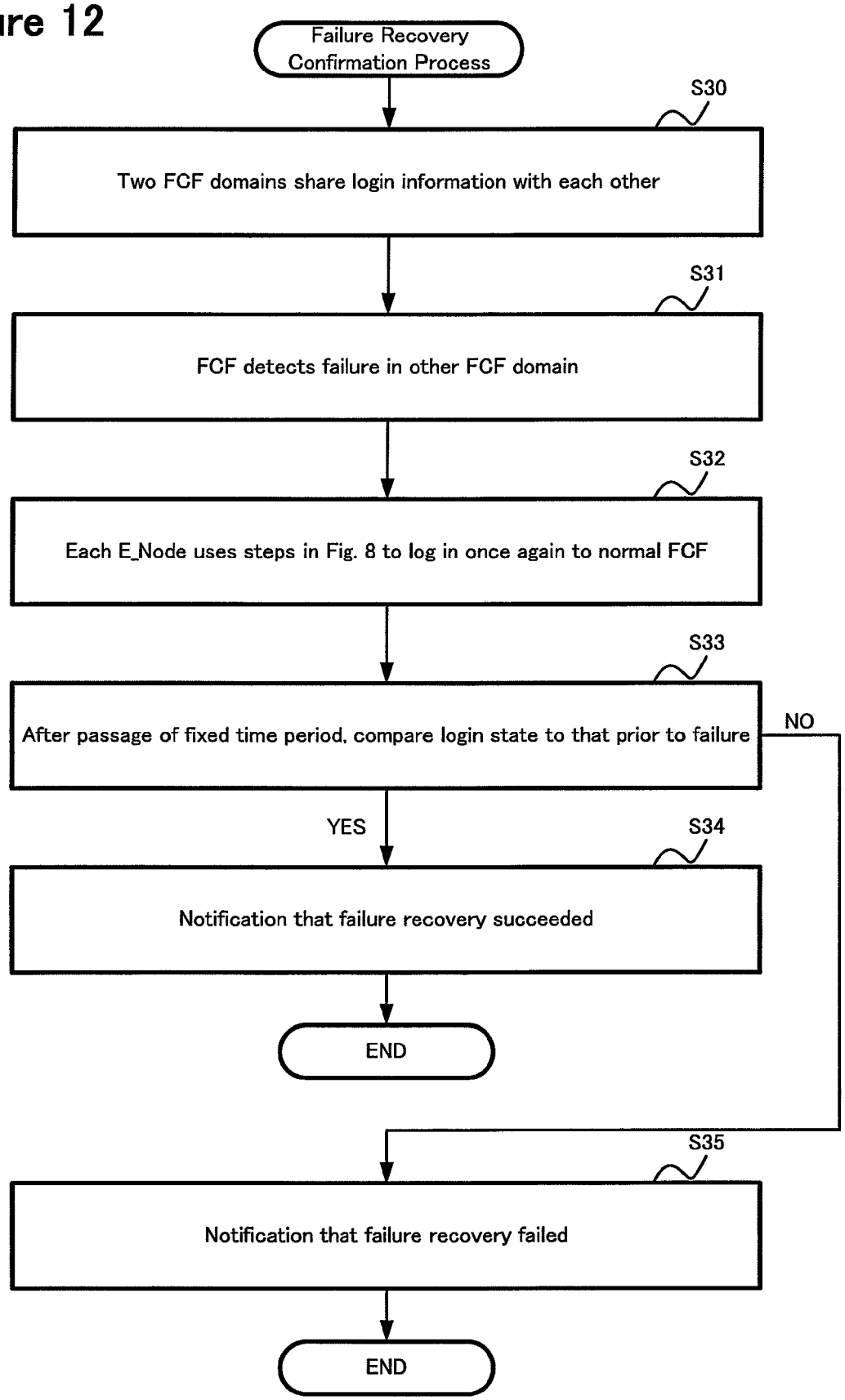
FIG. 12 is a flowchart showing the processing for confirming a recovery.

FIG. 12 is a flowchart showing the processing for confirming a recovery from a failure. This processing, specifically, is for confirming that the login process from the E_Nodes 31a, 41a described using FIG. 8 to the normal FCF 10b was performed normally for all the E_Nodes 31a, 41a, and that the instance creation of the VN_Ports 33 and 43 were performed normally the same as before. For this reason, the login processing performed by the E_Node of FIG. 8, the processing of FIG. 11 in which the VN_Port for which an instance was created subsequent to login sends a request to the nameserver 16, and the processing of FIG. 12 are implemented in parallel.

The FCFs 10a and 10b exchange and share the fabric login information T12 and T13 with each other when the FCF are normal (S30).

The FCF 10b knows that a failure has occurred in the other FCF 10a by watching for either a response timeout for the FIP keep alive communicated with the VE_Port, or a change in the physical link 55 (S31).

When a failure occurs in the FCF, the respective E_Nodes implement login processes with respect to the normal FCF, and create VN_Port instances using the steps shown in FIG. 10 (S32).

When a sufficiently long fixed period of time has elapsed since the login processes for all the E_Nodes 31a and 41a was complete, the normal FCF makes use of the login information of the failed FCF to compare and determine that all the E_Nodes 31a, 41a have re-created all the VN_Port instances (S33). In a case where the determination is that the fabric configuration is the same as it was prior to the failure (S33: YES), the normal FCF 10b notifies the management terminal 60 to the effect that the failure recovery succeeded (S34). By contrast, in a case where the determination is that the login status of the FCF that belonged to the domain prior to the failure is not the same as the before the failure occurred (S33: NO), the normal FCF notifies the management terminal 60 to the effect that the failure recovery failed (S35).

In accordance with configuring this example like this, it is possible to achieve a FCoE communication network with a redundant configuration, and to enhance communication network reliability. In addition, the communication path P20 between the nodes 31 and 41 that belong to the domain suspended by a failure can be reconstructed by the failover-destination FCF 10b. In accordance with this, the communication bandwidth for data I/O is maintained the same as it was prior to the failure, making it possible to operate the communication network.

Furthermore, in this example, user usability is enhanced by the fact that a confirmation is made as to whether or not failure recovery was performed normally, and the result of this confirmation is displayed on the management terminal 60. Also, in the first example, a case in which a failure occurred in the FCF 10a was given as an example in the explanation, but the same also holds true in a case where a failure occurs in the FCF 10b.

Example 2

A second example will be explained by referring to FIGS. 13 and 14. Each of the following examples, to include this example, corresponds to a variation of the first example. Therefore, the explanations will focus on those points that differ from the first example. In this example, the FCFs 10a and 10b are redundantly coupled to one another's fabric.

Figure 13:
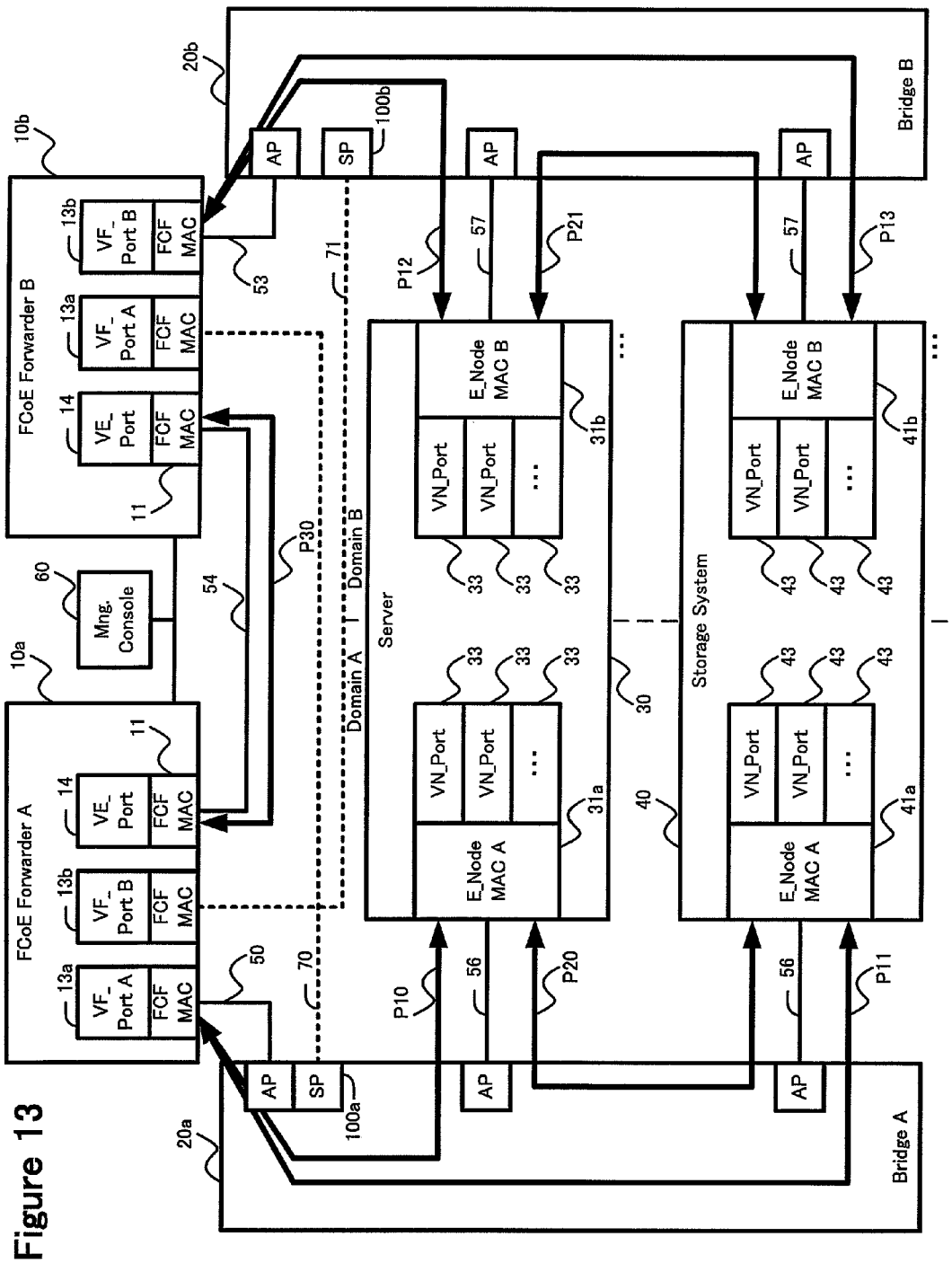
FIG. 13 is a diagram showing the essential elements of a system related to a second example.

FIG. 13 shows the essential elements of a network system according to this example. The bridge 20a is coupled to the VF_Port 13A of the FCF 10b of the domain 13 by way of a physical link 70. Similarly, the bridge 20b is coupled to the VF_Port 13B of the FCF 10a of the other domain by way of another physical link 71. Focusing on the bridges 20a, 20b, the bridge 20a is coupled to the VF_Port 13A of the FCF 10a and the VF_Port 13A of the FCF 10b, and the bridge 20b is coupled to the VF_Port 13B of the FCF 10a and the VF_Port 13B of the FCF 10b.

The physical links 70 and 71 are stand-by link in a case where the communication network is normal. SP of Port 100a and 100B means Stand-by Port. That is, the links that make use of the physical links 70 and 71 are in the standby mode. In a case where a failure has been detected, it is possible to use the physical link that is coupled to the bridge inside the domain in which the failure occurred. The steps for making the link usable are the same as the steps by which the bridge changes the physical link 55 to the active mode explained using Example 1, and as such, this explanation will be omitted.

Figure 14:
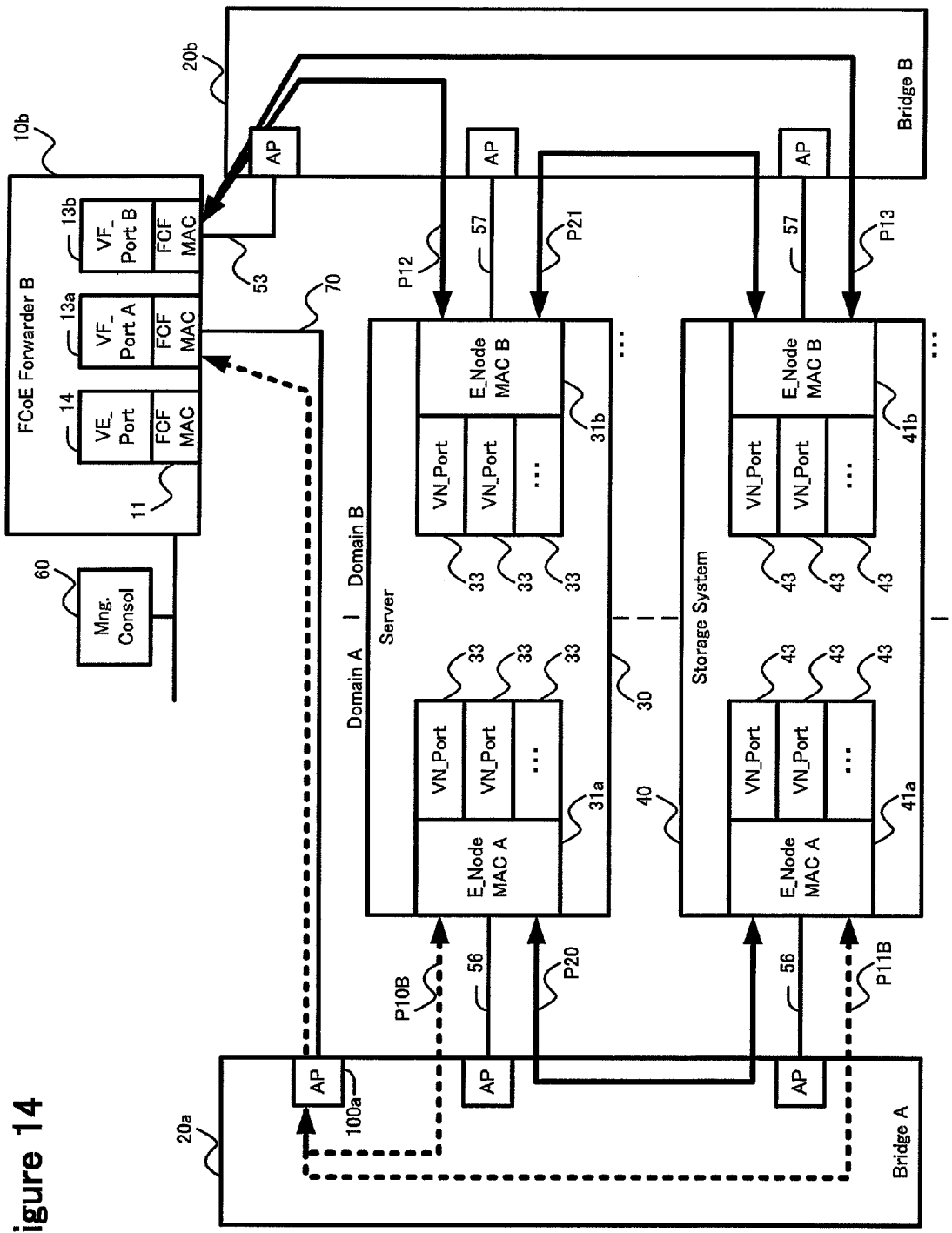
FIG. 14 is a diagram showing how the system recovered from a failure.

FIG. 14 shows a state in which a failure has occurred in the FCF 10a, and a switchover has been made so that the bridge 20a carries out the domain A control communications by way of the physical link 70. The bridge 20a activates the physical link 70, and the E_Nodes 31a and 41a, which belonged to the domain A prior to the failure, send login and other such control information to the VF_Port 13a of the FCF 10b via management communication paths P10b and P11b by way of the physical link 70. The management communication paths P10b and P11b comprise communications between the E_Node and the VF_Port and communications between the VN_Port and the VF_Port, as well as communications between the respective VF_Ports and the N_Port of the FCF nameserver. Configuring this example like this also exhibits the same operational advantage as the first example.

Example 3

Figure 15:
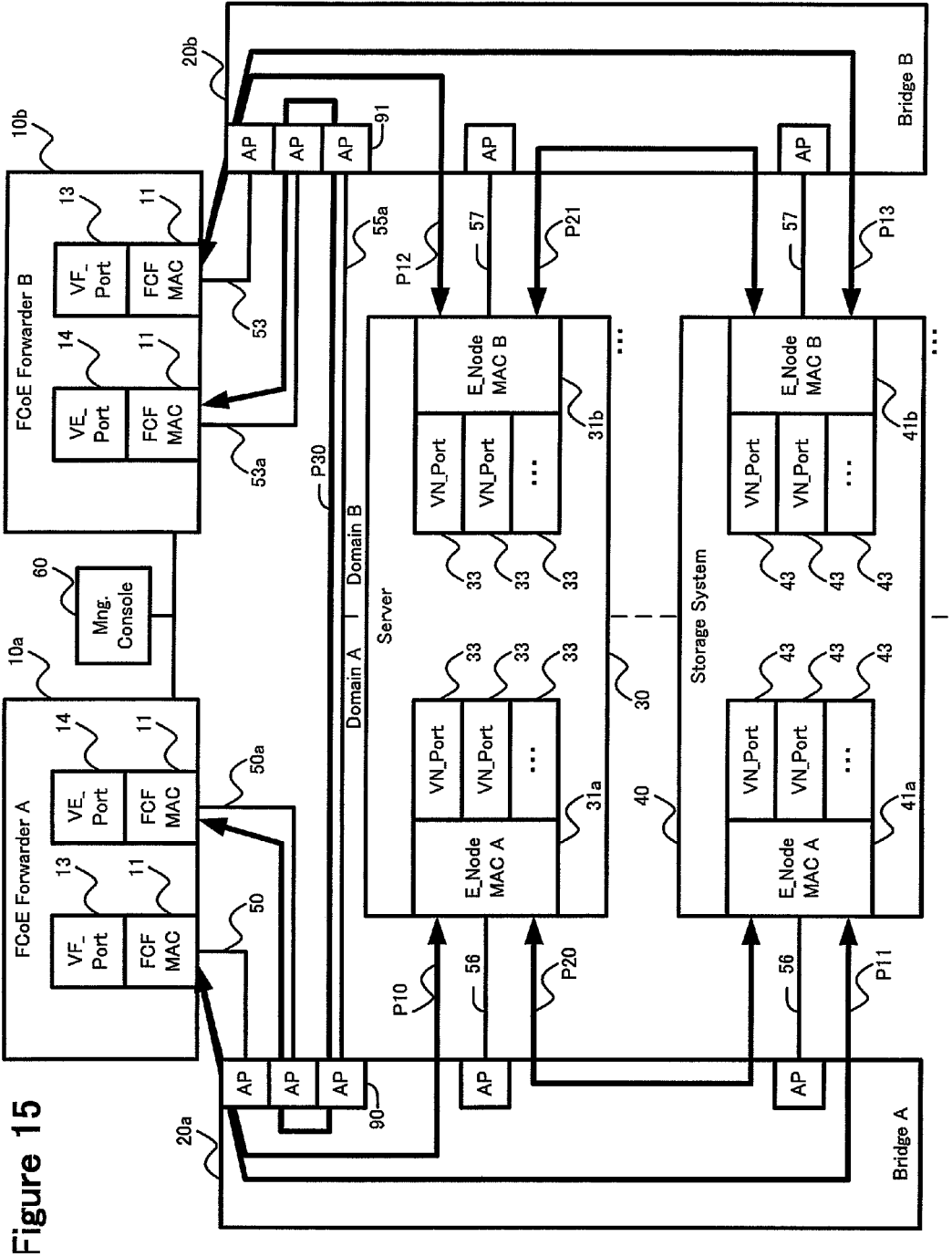
FIG. 15 is a diagram showing the essential elements of a system related to a third example.

A third example will be explained by referring to FIGS. 15 and 16. In this example, a physical link 55a, which couples the bridges 20a and 20b, is also used in a case where the communication network is normal. FIG. 15 shows a system in a case where the communication network is normal, and FIG. 16 is a diagram showing a post-failover system.

The FCFs 10a and 10b use an inter-bridge physical link 55a to provide communication path P30. The FCFs 10a and 10b exchange management information with each other via the communication path P30 that uses a logical link of the physical link 55a. However, the logical link from the domain A to the domain B and the logical link from the domain B to the domain A are both state of stand-by logical link at normal times. That is, when the system is operating normally, the physical link 55*a* is used for exchanging management information. The physical link 55*a*, for example, is logically partitioned into a management information communication path P30 and inter-domain communication control in accordance with VLAN (virtual LAN) control.

Figure 16:
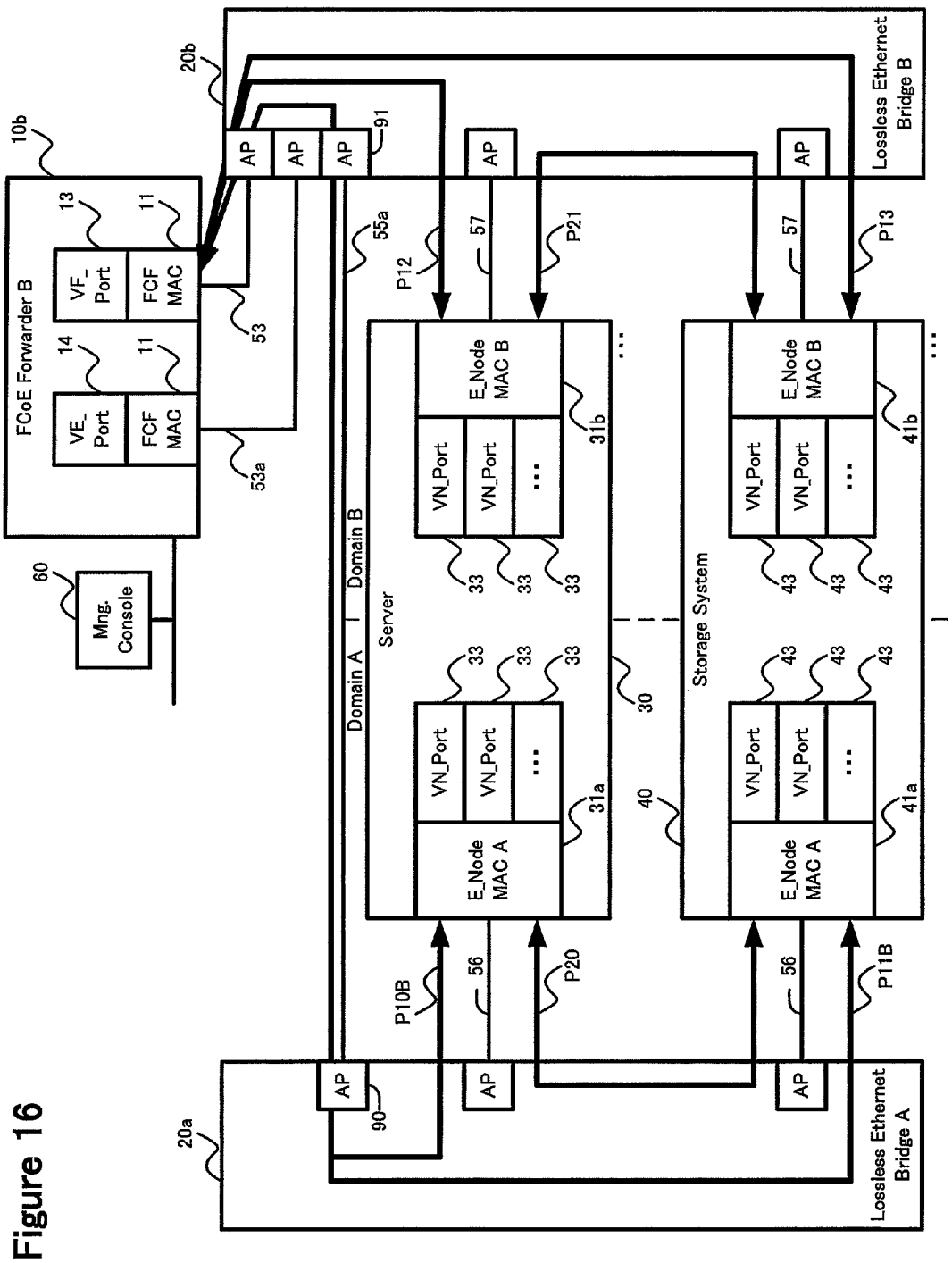
FIG. 16 is a diagram showing how the system recovered from a failure.

In a case where a failure occurs, as shown in FIG. 16, the bridge 20*a* activates the inter-domain communication control VLAN. In accordance with this, the E_Nodes 31*a* and 41*a* belonging to the domain in which the failure occurred are able to access the normal FCF 10*b* via the management communication paths P10*b* and P11*b* using the inter-domain logical link provided in the physical link 55*a*. Furthermore, when an FCF fails, it is not possible to communicate with the failed FCF, and as such, the communication path P30 for exchanging management information is not established.

In this example, the inter-bridge physical link 55*a*, which is used when there is a failure, is also utilized when the FCF is normal, and the FCF regularly performs FIP keep alive and other such management communications. For this reason, it is possible to avoid a situation in which a failure had already occurred in the physical link when the FCF failed, the inter-domain VLAN is unable to be activated and failure processing fails.

Configuring this example like this exhibits the same operational advantages as the first example. In addition, it is possible to monitor the physical link 55*a* daily to determine whether or not it is normal, enabling reliability to be enhanced even further since the physical link 55*a* will definitely be able to be used when the FCF fails.

Example 4

A fourth example will be explained by referring to FIGS. 17 and 18. In this example, the network topology of FIG. 17, which is an extension of the network configuration of FIG. 2, will be considered. In a large-scale network configuration like that shown in FIG. 17, one FCF should allocate unique N_Port ID to all the VN_Port instance of all the E_Nodes A coupled to the domain A respectively. When a failure occurs in the FCF of the one domain, all the E_Nodes issue login requests to the normal FCF of the other domain in order to create VN_Port instances by switching to the physical link 55. For this reason, when the domain fields of the FC N_Port IDs 1090 become the same value in a large-scale configuration like this, constraints are placed on the scale of the network configuration, thereby requiring that domain fields 1091 of N_Port IDs be virtually allocated. Accordingly, the FCF are able to create even more VN_Ports by virtually allocating domain fields to the respective bridges.

Specifically, since the port field of the N_Port ID 1090 shown in FIG. 3*b* is the field used for creating a plurality of VN_Port instances in the E_Node via a FIP NIPV FDISC, the port field is not able to be used in a case where a large number of VN_Ports will be used for the E_Node of one server or one storage system. For the area field as well, in a case where a large number of E_Nodes exists for one domain, the upper limit for this field is 256, so that the number of E_Nodes that can be coupled to the server and storage system is restricted to 256. As described above, since it is necessary to create an FC N_Port ID with a unique value for each VN_Port, when a failure occurs, the FC domain number, which has been allocated to one normal FCF, is aggregated into a single number, thereby making the domain field 1091 of the FC N_Port ID 1090 the same value in the domain A and the domain B and cutting the number of usable area fields of the FC N_Port ID by one half to 128. Therefore, a mechanism for virtually increasing the FC domain number is needed.

Figure 17:
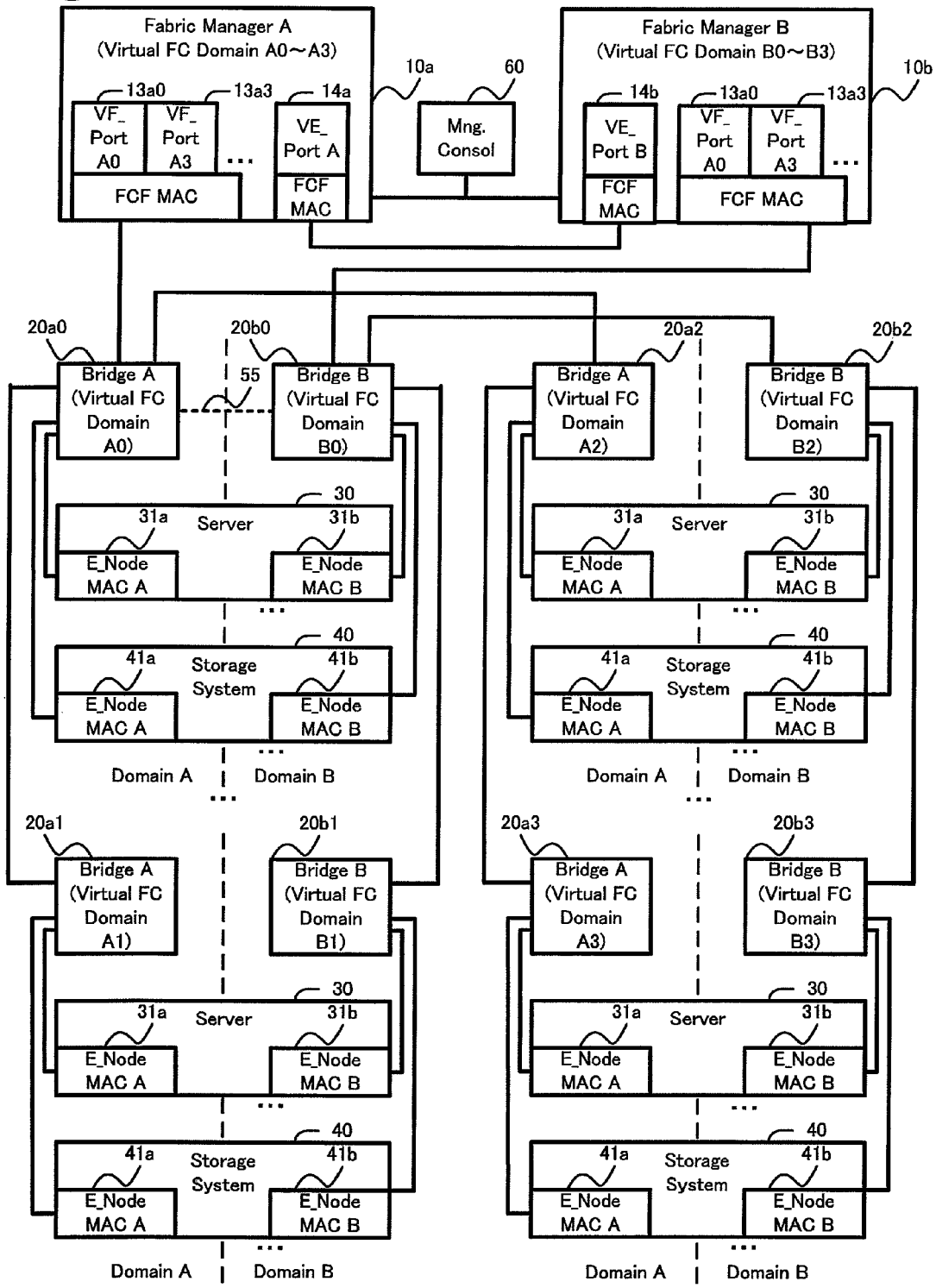
FIG. 17 is a diagram showing the essential elements of a system related to a fourth example.

In FIG. 17, a FC domain number is virtually allocated to each bridge. For example, bridges 20*a*0, 20*a*1, 20*a*2, and 20*a*3 are coupled to the domain A. One VF_Port of one FCF controls the login requests from the E_Node MACs, which are coupled to the bridges 20*a*0, 20*a*1, 20*a*2, and 20*a*3. The same holds true for the domain B as well.

Accordingly, the FCF virtually assigns a FC domain number to each bridge, thereby making it possible for the FCF to allocate a domain field of the N_Port ID to the E_Node, which is coupled to each of the bridges for the E_Nodes that respectively belong to the bridges 20*a*0, 20*a*1, 20*a*2, and 20*a*3.

FIG. 18 is a flowchart of the processing for allocating a virtual domain ID to a bridge. Each bridges 20, upon detecting a change in the link status, exchanges bridge information with the bridges using such as BPDU (Bridge Protocol Data Unit) protocol (S40). Therefore, for example, in a case where a new bridge 20 is, added to the communication network system, the new bridge sends new bridge information to either all of the bridges and the FCF or to the fabric management mechanism. When a bridge 20 is deleted either all of the bridges and the FCF or the fabric management mechanism detect this change, and delete the information related to the relevant deleted bridge.

Either the FCF 10 or the fabric management mechanism references the virtual FC domain number management information T15, detects a bridge 20 for which a virtual FC domain number that corresponds to the collected bridge information has yet to be allocated, and allocates one unused virtual FC domain number to this detected bridge 20 (S41).

Either the FCF 10 or the fabric management mechanism creates an instance of the VF_Port corresponding to the newly allocated virtual FC domain number (S42). In accordance with this, the FCF is able to carry out processing via the individual VF_Ports 13*a*0, 13*a*1, 13*a*2, 13*a*3 for domain A and VF_Ports 13*b*0, 13*b*1, 13*b*2, 13*b*3 for domain B corresponding to each virtual FC domain number.

According to the flow of processing of FIG. 18, each FCF has a plurality of instances of the VF_Port corresponding to the virtual FC domain number that was allocated to each bridge for a single FCF_MAC as shown in FIG. 18. Further, a virtual FC domain number is allocated to each bridge. During normal operation, the FCF A manages the virtual FC domain numbers a0, a1, a2, a3. In a case where a failure has occurred in the FCF A, the normal FCF B manages the virtual FC domain numbers a0, a1, a2, a3 for domain A and the virtual FC domain numbers b0, b1, b2, b3 for domain B.

A unique virtual FC domain number may be allocated to all the bridges, and the depletion of the area fields of the N_Port ID may be computed on the basis of the total number of bridge ports, and a new virtual FC domain number may be allocated to a bridge at depletion time.

Configuring this example like this exhibits the same operational advantages as the first example. In addition, in this example, a virtual FC domain ID is allocated to the bridge 20. In accordance with this, more VN_Ports can be created than in the first example.

In the present invention, as described hereinabove, in a case where a failure occurs in the one FCF, the other normal FCF takes over management. Therefore, the failover-destination FCF must take charge of the VN_Ports handed over from the failed domain in addition to the VN_Ports of the E_Node MAC it has been managing from the start. For this reason, it is preferable that the configuration be such that it is possible to create a larger number of VN_Port instances. In this example, since a virtual FC domain ID is allocated to the bridge as described above, it is possible to create a large number of VN_Port instances. Therefore, it is possible to organically join with the configuration of the first example, and to effectively achieve system redundancy.

The present invention is not limited to the above-described embodiment. A person having ordinary skill in the art will be able to make various additions and changes without departing from the scope of the present invention.

REFERENCE SIGNS LIST

3 Server
4 Storage system
5 Failure-use communication line
10a, 10b FCF
11 FCF MAC
13 VF_Port
14 VE_Port
20a, 20b Bridge
30 Server
40 Storage system
31, 41 E_Node MAC
33, 43 VN_Port
60 Management terminal

The invention claimed is:

1. A communication network control system, comprising:
a plurality of fibre channel over ethernet (FCoE) forwarders configured to manage a plurality of nodes on the communication network;
a plurality of bridge devices disposed between the plurality of FCoE forwarders and the plurality of nodes, each of the plurality of bridge devices being configured to route control data between one of the plurality of FCoE forwarders and one of the plurality of nodes and to route I/O data between the plurality of nodes without routing the I/O data through any of the plurality of FCoE forwarders;
a fabric management information sharing device configured to share, between the plurality of FCoE forwarders, fabric management information managed by each of the plurality of FCoE forwarders; and
a switcher coupled between at least two of the plurality of bridge devices, wherein at least one of the bridge devices is configured to:
detect a failure of one of the plurality of FCoE forwarders, and
on a condition that the at least one of the bridge devices detects a failure of one of the FCoE forwarders, activate the switcher to re-route control data destined to the one of the FCoE forwarders for which the failure was detected to a normal one of the plurality of FCoE forwarders for which the failure was not detected, wherein the normal one of the plurality of FCoE forwarders is configured to manage the re-routed control data on the basis of the fabric management information acquired from the one of the plurality of FCoE forwarders for which the failure was detected,
wherein each of the plurality of bridge devices is configured to continue to route the I/O data between the plurality of nodes without routing the I/O data through any of the plurality of FCoE forwarders on a condition that the at least one of the bridge devices detects a failure of one of the plurality of FCoE forwarders.

2. The communication network control system according to claim 1, wherein
a communication protocol, which is for transporting a storage area network protocol over a local area network communication medium, and for which a data input/output communication path for each of the plurality of nodes to send and receive data differs from the fabric control communication path for the plurality of nodes to send and receive the control information needed for coupling to the fabric, is applied to the communication network,
a first network domain, which is managed by one of the plurality of FCoE forwarders and a second network domain, which is managed by the other one of the plurality of FCoE forwarders, are set in the communication network,
a redundant configuration comprises the first network domain and the second network domain,
one half the plurality of nodes belongs to the first network domain,
the other half of the plurality of nodes belongs to the second network domain,
a plurality of computer apparatuses, which are provided on the communication network, having a plurality of nodes that belong to the first network domain and a plurality of nodes that belong to the second network domain,
each of the FCoE forwarders has a mechanism for managing a fibre channel fabric,
each of the FCoE forwarders has a control device that allocates a fibre channel domain number to the bridge devices,
each of the plurality of bridge devices, which is coupled to the first network domain, is coupled to each of the plurality of nodes that belong to the first network domain,
each of the plurality of bridge devices, which is coupled to the second network domain, is coupled to each of the plurality of nodes that belong to the second network domain,
the management information sharing device has a memory, which is provided inside a particular one of the plurality of FCoE forwarders and which stores the fabric management information, and a management information sharing unit, which sends and receives the fabric management information from the memory inside a peer FCoE forwarder via an inter-fabric management mechanism communication path that is coupled to the peer FCoE forwarder,
the fabric management information includes first access control information for controlling access to the plurality of nodes that belong to the first network domain, second access control information for controlling access to the plurality of nodes that belong to the second network domain, first login information for managing a coupling configuration of the plurality of nodes that are logged into one of the FCoE forwarders that is in charge of the first network domain, second login information for managing a coupling configuration of the plurality of nodes that are logged into the other one of the FCoE forwarders that is in charge of the second network domain, and switch information for managing the plurality of bridge devices, and
the failure-use communication path is configured using an inter-switch communication circuit for coupling a bridge device, which is coupled to the one of the FCoE forwarders, with another bridge device, which is coupled to the other one of the FCoE forwarders.

3. The communication network control system according to claim 2, wherein
the fabric control communication path is a path for communicating with a FCoE forwarder before the failure occurs by way of a bridge device from a prescribed node that belongs to the same network domain,
the data input/output communication path is a path for communicating to the other prescribed node by way of a bridge device from a certain prescribed node that belongs to the same network domain,
in a case where either a failure of the FCoE forwarder or a failure of the fabric control communication path occurs, the data input/output communication path temporarily ceases to exist, and
the data input/output communication path is restored on the same path as prior to the failure in a case where the prescribed nodes have switched the fabric control communication path to the normal FCoE forwarder.

4. The communication network control system according to claim 3, wherein the fabric management information includes access control information for controlling access to the plurality of nodes, login information for managing a fabric coupling configuration of the plurality of nodes that are logged in to the FCoE forwarders, and switch information related to the plurality of bridge devices that are respectively coupled to the FCoE forwarders.

5. The communication network control system according to claim 4, wherein the FCoE forwarders determine whether or not the prescribed nodes have been switched over normally, on the basis of the fabric management information acquired from the FCoE forwarder in which a failure occurs.

6. The communication network control system according to claim 1, wherein
the failure-use communication path is configured using an inter-switch communication circuit for coupling a bridge device, which is coupled to one of the FCoE forwarders, to another bridge device, which is coupled to the other one of the FCoE forwarders, and
the inter-switch communication circuit is configured so as to be able to be used in accordance with an instruction from the switcher.

7. The communication network control system according to claim 1, wherein
the failure-use communication path is configured using a redundant communication circuit for coupling the plurality of bridge devices to another FCoE forwarder, which differs from the FCoE forwarder that directly manages the plurality of bridge devices, and
with the switcher detecting the occurrence of a failure, the redundant communication circuit creates a fabric control communication path spanning network domains having the redundant configuration.

8. The communication network control system according to claim 1, wherein
the failure-use communication path is configured using an inter-switch communication circuit for coupling a bridge device, which is coupled to one of the FCoE forwarders, to another bridge device, which is coupled to the other one of the FCoE forwarders,
the one of the FCoE forwarders and the other one of the FCoE forwarders exchange the fabric management information via the inter-switch communication circuit, and
in a case where the failure has occurred, the switcher, upon detecting the failure, uses the inter-switch communication circuit to create a fabric control communication path spanning network domains having the redundant configuration.

9. The communication network control system according to claim 1, wherein
the FCoE forwarders each have a control device that allocates a fibre channel domain number to the bridge device,
the control device, which allocates the domain number, allocates a plurality of fibre channel logical fabrics to one network domain, and
the FCoE forwarders create a plurality of logical control ports in one physical port to control the fibre channel logical fabrics.

10. The communication network control system according to claim 1, wherein
a fibre channel over Ethernet (Ethernet is a registered trademark) protocol, which is a communication protocol for transporting a storage area network protocol over a local area network communication medium, and for which a data input/output communication path for the plurality of nodes to send and receive input/output data differs from a fabric control communication path for the plurality of nodes to send and receive control information needed for coupling to a fabric, is applied to the communication network,
the FCoE forwarders each have a name server that manages a fibre channel fabric, and
the plurality of bridge devices each have a switching mechanism for the plurality of nodes to perform a data I/O communication without going through the FCoE forwarder based on either transmission source and destination addresses included in a frame header for the local area network, or transmission source and destination port addresses included in the fibre channel frame header in the local area network frame.

11. A method for controlling a communication network, the communication network including:
a plurality of fibre channel over ethernet (FCoE) forwarders configured to manage a plurality of nodes on the communication network; and a plurality of bridge devices disposed between the plurality of FCoE forwarders and the plurality of nodes, the method comprising:
routing control data between the plurality of FCoE forwarders and the plurality of nodes; routing I/O data between the plurality of nodes without routing the I/O data through any of the plurality of FCoE forwarders;
exchanging fabric management information managed by each of the plurality of FCoE forwarders between the plurality of FCoE forwarders;
monitoring to detect whether or not a failure has occurred in each of the plurality of FCoE forwarders;
on a condition that a failure is detected in at least one of the plurality of FCoE forwarders, activating a switcher to re-route control data destined to the one of the plurality of FCoE forwarders for which the failure was detected to a normal one of the plurality of FCoE forwarders for which the failure was not detected;
managing the re-routed control data on the basis of the fabric management information exchanged between the plurality of FCoE forwarders; and
continuing to route the I/O data between the plurality of nodes without routing the I/O data through any of the plurality of FCoE forwarders on a condition that a failure of at least one of the plurality of FCoE forwarders is detected.

12. The communication network control method according to claim 11, wherein the plurality of FCoE forwarders allocate a domain number for a fibre channel fabric to a plurality of the bridge devices inside one network domain, and by logically partitioning the fibre channel fabric, expands the number of nodes of one domain, and the FCoE forwarders create a plurality of fabric management ports with respect to one physical port for managing the domain numbers in a plurality of the fibre channel fabrics.

* * * * *